United States Patent
Nagano et al.

(10) Patent No.: US 7,428,659 B2
(45) Date of Patent: Sep. 23, 2008

(54) PROGRAMMABLE CONTROLLER WITH CPU UNITS AND SPECIAL-FUNCTION MODULES AND METHOD OF DOUBLING UP

(75) Inventors: Eisuke Nagano, Tagata-gun (JP); Masanori Fukushima, Suntou-gun (JP); Kenichiro Tomita, Tagata-gun (JP); Kazuaki Tomita, Mishima (JP)

(73) Assignee: OMRON Corporation, Kyoto (JP)

( * ) Notice: Subject to any disclaimer, the term of this patent is extended or adjusted under 35 U.S.C. 154(b) by 1105 days.

(21) Appl. No.: 10/455,738

(22) Filed: Jun. 4, 2003

(65) Prior Publication Data
US 2004/0025078 A1    Feb. 5, 2004

(30) Foreign Application Priority Data
Jun. 7, 2002 (JP) .............................. 2002-203285
Jun. 2, 2003 (JP) .............................. 2003-156654

(51) Int. Cl.
*G06F 11/00* (2006.01)
(52) U.S. Cl. .......................................... 714/12; 714/13
(58) Field of Classification Search .................. 714/12; 700/82
See application file for complete search history.

(56) References Cited

U.S. PATENT DOCUMENTS

| | | | | |
|---|---|---|---|---|
| 4,428,044 A | * | 1/1984 | Liron ........................... | 714/12 |
| 4,965,717 A | * | 10/1990 | Cutts, Jr. et al. .............. | 714/12 |
| 5,204,952 A | * | 4/1993 | Ayers et al. ................... | 714/48 |
| 5,226,152 A | * | 7/1993 | Klug et al. .................... | 714/12 |
| 5,255,367 A | * | 10/1993 | Bruckert et al. ............... | 714/11 |
| 5,317,726 A | * | 5/1994 | Horst ........................... | 714/12 |
| 6,223,304 B1 | * | 4/2001 | Kling et al. ................... | 714/12 |
| 6,393,582 B1 | * | 5/2002 | Klecka et al. ................. | 714/11 |
| 6,473,869 B2 | * | 10/2002 | Bissett et al. .................. | 714/12 |
| 6,604,177 B1 | * | 8/2003 | Kondo et al. ................. | 711/150 |
| 7,191,359 B2 | * | 3/2007 | Shimamura et al. .......... | 714/12 |
| 7,370,232 B2 | * | 5/2008 | Safford ......................... | 714/11 |
| 2002/0152418 A1 | * | 10/2002 | Griffin et al. .................. | 714/11 |

FOREIGN PATENT DOCUMENTS

| | | |
|---|---|---|
| JP | 05-173986 | 7/1993 |
| JP | 06-324722 | 11/1994 |
| JP | 09-073304 | 3/1997 |
| JP | 2000-353105 | 12/2000 |
| JP | 2001-022414 | 1/2001 |

* cited by examiner

*Primary Examiner*—Gabriel L Chu
(74) *Attorney, Agent, or Firm*—Weaver Austin Villeneuve & Sampson LLP

(57) ABSTRACT

A programmable controller includes two CPU units each having a detachably attached special-function module for carrying out a calculation process, each of the two CPU units recognizing conditions of the other CPU unit, one of them becoming an active unit and the other becoming a standby unit such that when the active unit fails and goes down the standby unit is switched to become active and resumes operations. The special-function module attached to the active CPU unit becomes an active module and carries out control processes with the active CPU unit and the other special-function module attached to the standby CPU unit becomes a standby module.

6 Claims, 17 Drawing Sheets

| 512W | | CPU | INNER | |
|---|---|---|---|---|
| +0 | CPU STATUS AREA (64W) | R/W | R | STB |
| +64 | INNER STATUS AREA (16W) | R | R/W | |
| +80 | CPU-INNER COM-RESP AREA (64W) | R/W | R/W | |
| +240 | RESERVE (16W) | - | - | |
| +256 | CPU STATUS AREA (64W) | R/W | R | ACT |
| +320 | INNER STATUS AREA (16W) | R | R/W | |
| +336 | CPU-INNER COM-RESP AREA (64W) | R/W | R/W | |
| +496 | RESERVE (16W) | - | - | |

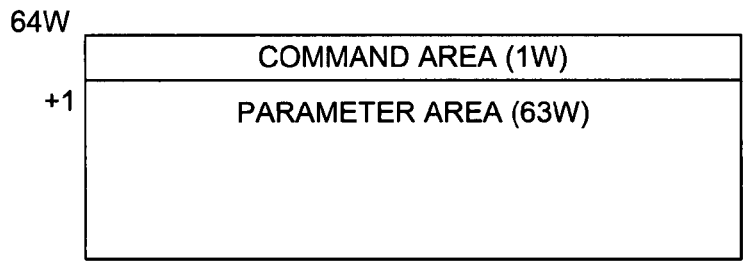
FIG. 7
| COMMAND NAME | CODE | RESPONSE CODE | |
|---|---|---|---|
| START SYNC | 0x0001 | 0x8001 | RESULTS TRANSFERRED |
| | | 0x4001 | NOT TRANSFERRED |
| START DATA TRANSFER | 0x0002 | 0x8002 | |
| START DATA CORRECT | 0x0003 | 0x8003 | |
| DIRECT ACCESS OK | 0x0004 | 0x8004 | |
| START CYCLIC | 0x0005 | 0x8005 | |
| START EVENT | 0x0006 | 0x8006 | |
| END EVENT | 0x0007 | 0x8007 | |
| END SNYC | 0x0008 | 0x8008 | |
FIG. 8
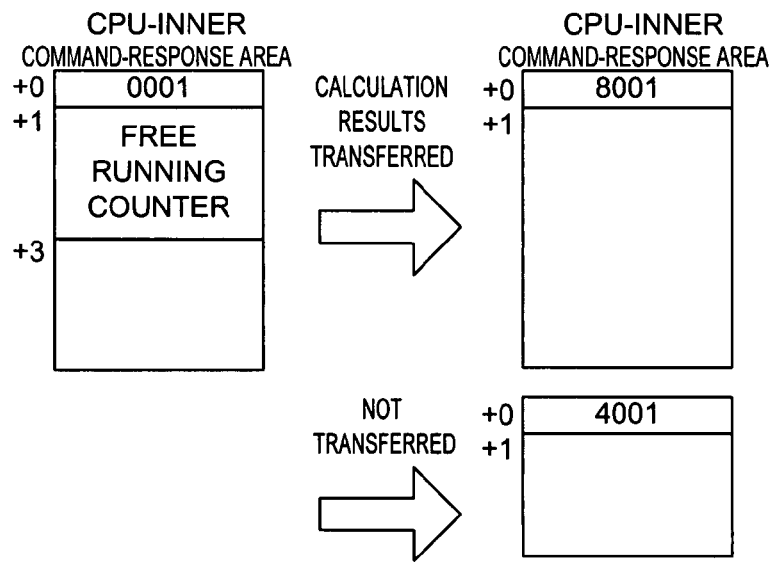
FIG. 9

PROGRAMMABLE CONTROLLER WITH CPU UNITS AND SPECIAL-FUNCTION MODULES AND METHOD OF DOUBLING UP

BACKGROUND OF THE INVENTION

This invention relates to a programmable controller, CPU units and special-function modules of which it is composed and a method of doubling up these components.

Programmable controllers (PLCs) are being used as control devices in factory automation (FA). Such PLCs are structured as an appropriate combination of a plurality of units such as a power source unit for supplying electrical power, a CPU unit for controlling the PLC as a whole, an input unit for inputting signals from switches and sensors positioned strategically for the FA devices, an output unit for outputting control signals to actuators or the like, and a communication unit for connecting to a communication network.

The control of a PLC by its CPU unit includes accepting signals inputted through the input unit into the I/O memory of the CPU unit ("IN-refresh"), carrying out a logical calculation according to a user program preliminarily registered in a user program language such as a ladder language ("calculation"), writing the result of such calculations in the I/O memory for transmitting it to the output unit ("OUT-refresh") and thereafter exchanging data through the communication unit with the other PLCs on the same communication network or through communication ports provided to the CPU unit with external devices ("peripheral processing") in a cyclic mode of operation. Operations of the IN-refresh and OUT-refresh are sometimes carried out together.

The CPU unit is usually provided with a RAM for storing user programs, a ROM for storing system programs, a MPU for carrying out calculations of the type described above, as well as RAMs (common, IO and work memories) to be used when these calculations are carried out. On the other hand, there are CPU units having a special-function module removably mounted to it. Such a special-function module may be variously referred to as an inner board or a sub-board (hereinafter referred to as the inner board) and is an intelligent high-performance board, having the function of executing programs created for carrying out dedicated processes for communicating, say, with external apparatus. The control by the CPU unit can thus be made faster and the level of the control can be improved by allowing the inner board to carry out a part of the aforementioned calculation process.

In order to improve the safety and reliability of a system, it has been known to double up each of the units that form the PLC. When the CPU unit is to be doubled up, two CPU units are provided and connected together by a CPU bus. These two CPU units are basically adapted to have the same functions and carry out user programs of the same content stored in the individual CPU units.

These two CPU units are operated such that one of them will become active to carry out cyclic processes to control a FA network system by reading and writing from and into memory devices and exchanging control data (I/O data) with I/O devices of external apparatus, etc. while the other of them will be in a standby condition, carrying out the same user programs as that of the active CPU unit while in the standby condition although the results of its calculations are not reflected in the IO memory. The results of processing by the active CPU unit are received by the standby CPU unit and the memory of the standby CPU unit is thereby updated. In this way, the memories of the active and the standby CPUs are maintained so as to have the same content.

If the active one of the two CPU units fails, the other CPU in the standby condition takes the place of the failed CPU unit and resumes the actual control processes. Thus, the failure of a CPU unit does not cause the system to stop immediately and the system operation can be continued, and the reliability of the system is improved.

In the case of a system with redundancy described above, its doubled-up condition is assured by keeping the IO memories of the CPU units in identical conditions. In the case of CPU units of the aforementioned type having an inner board mounted thereto, memories inside the main bodies of the CPU units are maintained to be equal but it has not been done to maintain their inner boards in the same condition.

SUMMARY OF THE INVENTION

It is therefore an object of this invention to provide a programmable controller comprised of two CPU units each having a special-function module mounted thereto, capable of forming a doubled-up system including the special-function modules.

It is another object of this invention to provide such CPU units, special-purpose modules and a method of doubling up such components.

A programmable controller according to this invention may be characterized as comprising two CPU units each having a detachably attached special-function module for carrying out a calculation process, each of the two CPU units recognizing conditions of the other CPU unit, one of them becoming an active unit and the other becoming a standby unit such that when the active unit fails and goes down the standby unit is switched to become active and resumes operations. The special-function module attached to the active CPU unit becomes an active module and carries out control processes with the active CPU unit and the other special-function module attached to the standby CPU unit becomes a standby module. Such a programmable controller is particularly safe and reliable because it is of a doubled-up structure including the special-function modules.

According to this invention, it is preferred that each of these CPU units exchanges data with its corresponding special-function module through a common memory shared therebetween. The special-function modules carry out the calculation process non-synchronously with the CPU units and while this calculation process is being carried out, the I/O data produced by this calculation process are not written into the common memory. Such I/O data are transferred to the CPU units only during an operation in synchronism with the CPU units.

Each of such CPU units according to this invention may be characterized not only as comprising a detachably attached special-function module for carrying out a calculation process to thereby produce I/O data and a common memory shared with this attached special-function module but also as being selectively in an active mode to carry out a control process based on a user program and in an standby mode wherein such control process is not carried out. The CPU unit of this invention while in the standby mode, upon detecting that another CPU unit similarly structured fails and goes down, switches into the active mode and resumes the control process. The data exchange between the CPU unit and the attached special-function module is carried out through their common memory. The CPU unit carries out an inner service process (including the storage of the I/O data in the common memory and wherein data are exchanged with the attached special-function module in synchronism) after carrying out a cyclic process that includes execution of the user program.

Each of the special-function modules according to this invention, to be detachably attached to the CPU unit as described above, may be characterized as comprising a common memory shared with the CPU unit, means for exchanging data with the CPU unit through the common memory, means for carrying out a calculation process non-synchronously with the CPU unit and thereby producing I/O data, means for transferring these I/O data to the CPU unit while carrying out a process in synchronism with the CPU unit but preventing the I/O data from being written in the common memory while the calculation process is being carried out.

A method according to this invention of providing a programmable controller with a doubled-up structure may be characterized as comprising the steps of providing two CPU units each having a special-function module capable of carrying out a calculation process, one of these two CPU units being an active CPU in an active mode and carrying out a control process, the other being a standby CPU unit in a standby mode, causing one of the special-function modules attached to the active CPU unit to be an active module and to carry out the control process together with the active CPU unit, causing the other of the special-function modules attached to the standby CPU unit to be a standby module, and activating the standby CPU unit and the standby module into the active mode if an abnormal condition occurs in the active CPU unit or the active module.

In such a method, data are exchanged between each special-function module and the CPU unit attached thereto by using a common memory shared therebetween. The two special-function modules carry out their calculation process non-synchronously with the CPU units but are prevented from writing the I/O data obtained by the calculation process into the common memory while the calculation process is being carried out. These I/O data are transferred to the CPU units while the special-function modules are operated in synchronism with the CPU units. In the above, it may be the CPU unit that carries out the writing of the I/O data into the memory or it may be done by the special-function module in response to a command from the CPU unit.

In summary, the two special-function modules carry out programs of the same content in a non-synchronous manner but since the system is of a doubled-up structure and the same data are processed, the final results of the calculations match. According to a preferred embodiment, furthermore, the results of the calculations carried out by the two special-function modules are compared and if they do not match, the module which is behind in carrying out the calculations is caused to carry out a correction process whereby the calculation process is advanced such that the two modules are equally advanced in the calculation process.

When the CPU units of such a programmable controller store the I/O data obtained by the calculation process, it is done only under the condition that the results of calculations by the two modules match. Thus, the rate of progress in the performance of the calculation process by the two modules match every time such a correction process is carried out. Thus, it can be made certain that the same data are written in as the result of the calculation process.

Moreover, when the variable data or parameter data stored in the memory of the active special-function module are changed by a command from outside, a request for a specified process may be made to the active CPU unit. In response, the active CPU unit obtains at least the changed content of the memory and outputs it to the standby module such that the contents of the memory of the active and standby modules come to match. In the above, the variable data stored in the memory of a special-function module mean such data that are cyclically rewritten, for example, by carrying out a calculation process. The parameter data stored in the memory of a special-function module are not those that are rewritten cyclically by carrying out the calculation process but are those rewritten from outside by means of a tool or the like such as data related to the system setting by the special-function module or user programs for the special-function modules.

The special-function module on the active side may have its memory content modified from outside by means of a tool while the calculation process is being carried out. Even in such a situation, the process as described above is carried out such that the changes can be transmitted to the special-function module on the standby side and the equality of data can be maintained. The aforementioned transmission to the special-function module in the standby mode may be carried out through the standby CPU unit or a mechanism may be introduced for making the transmission directly to the special-function module.

BRIEF DESCRIPTION OF THE DRAWINGS

FIG. 7 shows an example of data structure in CPU-INNER command response area.

FIG. 8 shows an example of command-response used in a CPU-INNER response area.

FIG. 9 shows an example of process for starting synchronization.

DETAILED DESCRIPTION OF THE INVENTION

Figures 1, 4:
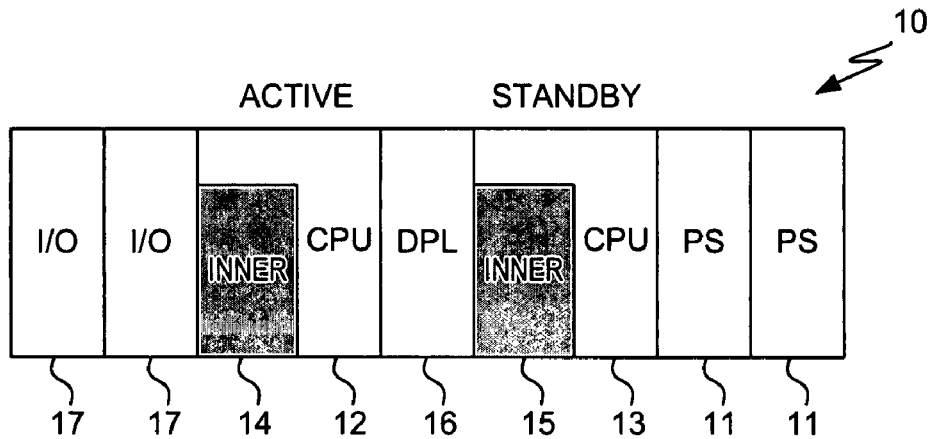
FIG. 1 is a block diagram of a programmable controller embodying this invention.
FIG. 4 shows an example of data structure in the I/F area between a CPU unit and an inner board.

The invention is described next by way of an example. FIG. 1 shows the structure of a programmable controller (PLC) 10 embodying this invention, comprised of a plurality of units, each of which is doubled up, including two electrical power source units 11 for supplying power to each unit of the PLC 10, two (first and second) CPU units 12 and 13 each having the functions of carrying out user programs and cyclically carrying out I/O-refresh and peripheral processes, a duplex unit (DPL) 16 for controlling the operations of these CPU units 12 and 13, and I/O units 17 for connecting to input and output devices. As shown more in detail, these units are mutually connected through a system bus 19. Units of other kinds may also be included, and the number of units of which the PLC 10 is composed may be increased or decreased, if necessary.

In this PLC 10, the power source units 11 and the CPU units 12 and 13 are doubled up. The two power source units 11, for example, are connected in parallel to supply power to the units of the PLC 10. Thus, even if one of them fails and becomes incapable of supplying power, the other can resume the supply of power.

The two CPU units 12 and 13 are adapted to carry out user programs of the same content. At the time of an actual operation, however, one of them becomes active and the other becomes a standby unit. The results of carrying out user programs by the active one of the CPU units are outputted through the I/O units to the external devices and are thereby reflected in the control. Although user programs of the same content are executed by the standby CPU unit, the results of this execution are not outputted. Instead, as the results of execution by the active CPU unit are received, the standby CPU unit updates the content of its memory, thereby maintaining itself in the same condition as the active CPU unit. Thus, as soon as the active CPU unit fails and goes down due to an abnormal condition, the standby CPU unit can immediately take the place of the failed CPU unit to resume the control operations. This is how a doubled-up system of a "hot standby type" is realized.

Figure 2:
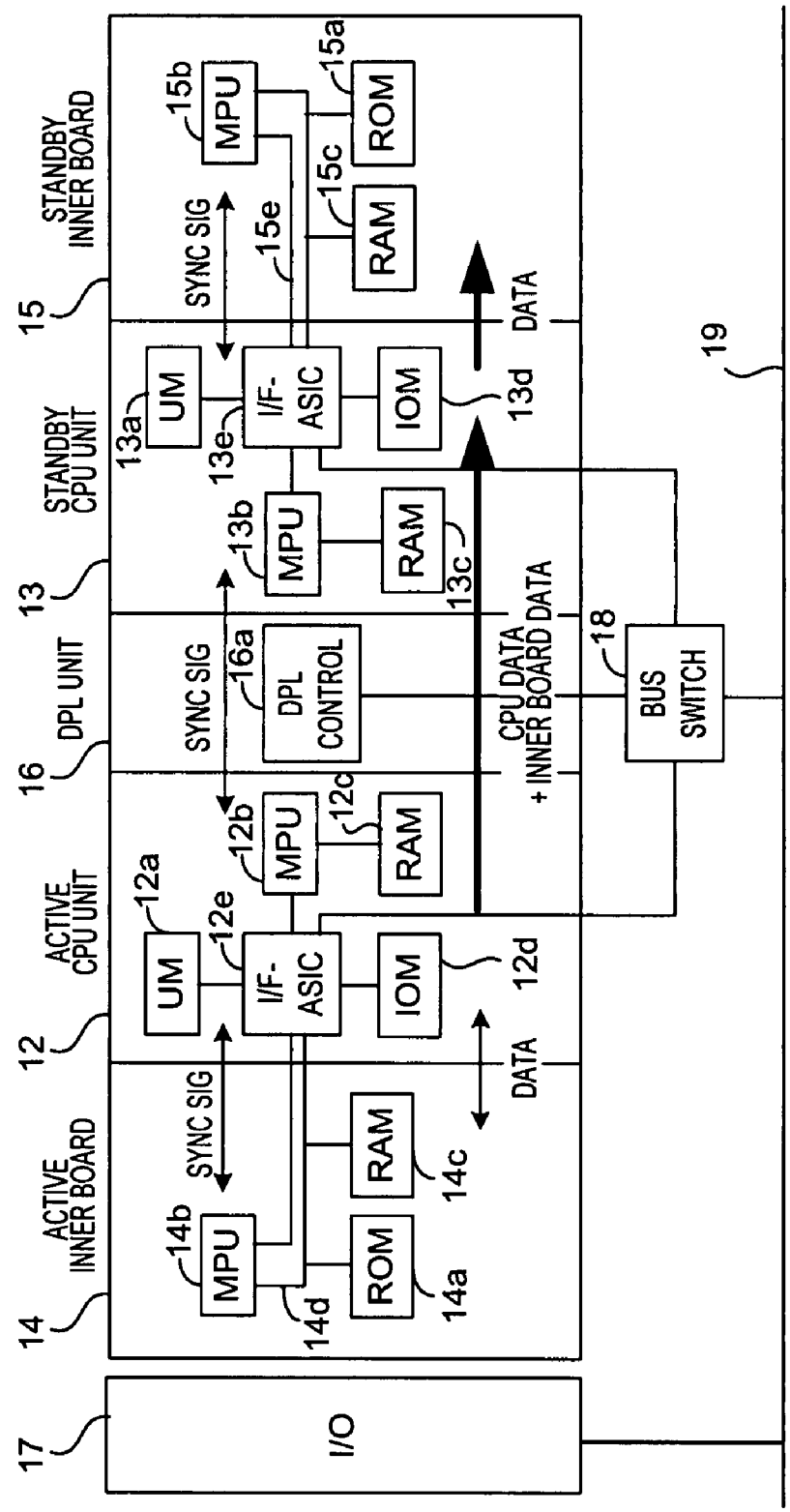
FIG. 2 is a more detailed block diagram of a portion of the programmable controller of FIG. 1.

This switching of roles between the first and second CPUs 12 and 13 is carried out by means of the aforementioned duplex unit 16 serving as a doubling control unit which, as shown in FIG. 2, includes a doubling control circuit (DPL CONTROL) 16a adapted to operate a bus switch 18 to switch the bus or to carry out synchronization control between the first and second CPU units 12 and 13. Data are also exchanged between the first and second CPU units through this duplex unit 16.

According to this embodiment of the invention, the first and second CPU units 12 and 13 are each provided with an inner board (the first inner board 14 and the second inner board 15, respectively). Explained more in detail, each of the inner boards 14 and 15 is inserted into a slot formed in the corresponding one of the CPU units 12 and 13 so as to be mechanically mounted and able to exchange data with the corresponding CPU unit through a bus. Each of these inner boards 14 and 15 can be selectively either active or in the standby condition, becoming active when the corresponding CPU unit 12 or 13 is active and in the standby condition when the corresponding CPU 12 or 13 is in the standby condition.

In the description which follows, it will be assumed that the first CPU unit and the first inner board are active (and referred to as the "active side") and the second CPU unit 13 and the second inner board 15 are in the standby condition (and referred to as the "standby side"). The first and second inner boards 14 and 15 each have the same functions as the first and second CPU units 12 and 13 to carry out same processes. The first and second CPU units 12 and 13 have the same hardware structure, and the first and second inner boards 14 and 15 also have the same hardware structure.

Explained more in detail with reference to FIG. 2, the first and second CPU units 12 and 13 each include a user memory 12a or 13a for storing user programs, a MPU 12b or 13b for executing these user programs stored in the user memory 12a or 13a and cyclically carrying out the I/O refresh and peripheral processes, a RAM 12c or 13c to be used as a work area during the executions by the MPU 12b or 13b, an IO memory 12d or 13d and I/F-ASIC 12e or 13e.

The first and second inner boards 14 and 15 are each provided with a ROM 14a or 15a storing system programs for the inner boards, a MPU 14b or 15b for communicating with the corresponding CPU unit and executing the system programs stored on the ROM 14a or 15a, and a RAM 14c or 15c storing user programs to be executed on the inner board and also to be used as a work area during the execution of the system programs.

The RAM 14a or 15a, the MPU 14b or 15b and the RAM 14c or 15c are connected through a bus 14d or 15d. The first and second inner boards 14 and 15 are respectively connected to the I/F-ASIS 12e and 13e of the first and second CPU units 12 and 13 through these buses 14d and 15d. Interrupt signal lines 14e and 15e are provided respectively between the MPU 14b or 15b of the first or second inner board 14 or 15 and the I/F-ASIS 12e or 13e.

The IO memories 12d and 13d function not only for storing I/O data which are ordinary control data but also as a common memory shared between the first and second CPU units 12 and 13 and the first and second inner boards 14 and 15 internally mounted therein, respectively. The I/F-ASICs 12e and 13e of the first and second CPU units 12 and 13 serve as mediators respectively when the MPUs 14b and 15b respectively inside the first and second CPU units 12 and 13 and the MPUs 14b and 15b respectively inside the first and second inner boards 14 and 15 access the corresponding IO memories 12d and 13d of the first and second CPU units 12 and 13. Data can thus be exchanged between inner boards and corresponding CPU units through the IO memories 12d and 13d.

As explained above, one of the CPU units (say, the first CPU unit 12) and one of the two inner boards (say, the first inner board 14) become active, the other CPU unit 13 and the other inner board 15 being in the standby condition. The first CPU unit 12 which is active carries out various processes cyclically such as the execution of a user program, the I/O refresh, peripheral service process and inner board service process while being in synchronism with the second CPU unit 13. The processing by the second CPU unit 13 in the standby condition is basically the same as that by the first CPU unit 12, user programs being executed and the results of the execution being stored in the IO memory 13d. Explained more in detail, synchronization is taken with the first CPU unit 12 and various processes are carried out cyclically such as the execution of user programs, peripheral service process and inner board service process. Unlike the active first CPU unit 12, the second CPU unit 13 in the standby condition does not carry out the I/O refresh process. The contents of the IO memory 13d of the active first CPU unit 12 are reflected as data in the IO memory 13d such that the stored contents of both match.

The first inner board 14, which is active, carries out a specified process when a synchronization process is carried out with the first CPU unit 12 and the aforementioned inner board service is carried out by the first CPU unit 12, and returns the results of the execution. In other words, the common memory area of the IO memory is used for exchanging data.

The second inner board 15 in the standby condition executes a synchronization process with the second CPU unit 13, carries out a specified process by reading out data in the common memory area of the IO memory 13d (where the results of calculation by the first CPU unit 12, etc. are reflected) and stores the results of its own calculations in the common memory area of the IO memory 13d.

As can be seen in FIG. 2, data flow only in one direction from the first CPU unit 12 to the second CPU unit 13, that is, the contents of the IO memory 12d of the first CPU unit 12 (data for CPU units and inner boards) are transmitted to and stored at a specified area of the IO memory 13d of the second CPU unit 13. Data for the inner board are delivered through the I/F-ASIC 13e to the second inner board 15. On the basis of the data thus delivered, the second inner board 15 carries out calculation and other processes.

In this manner, the IO memories 12d and 13d come to store the same data and the second CPU unit 13 and the second inner board 15 can carry out the same processes as the first CPU unit 12 and the first inner board 14. Thus, the same results of calculations, etc. are obtained and as soon as an abnormal situation occurs in the first CPU unit 12 or the first inner board 14, the second CPU unit 13 and the second inner board 15 are activated and carry out the active processes. In other words, the operations and controls can be resumed smoothly and continuously.

Figure 3:
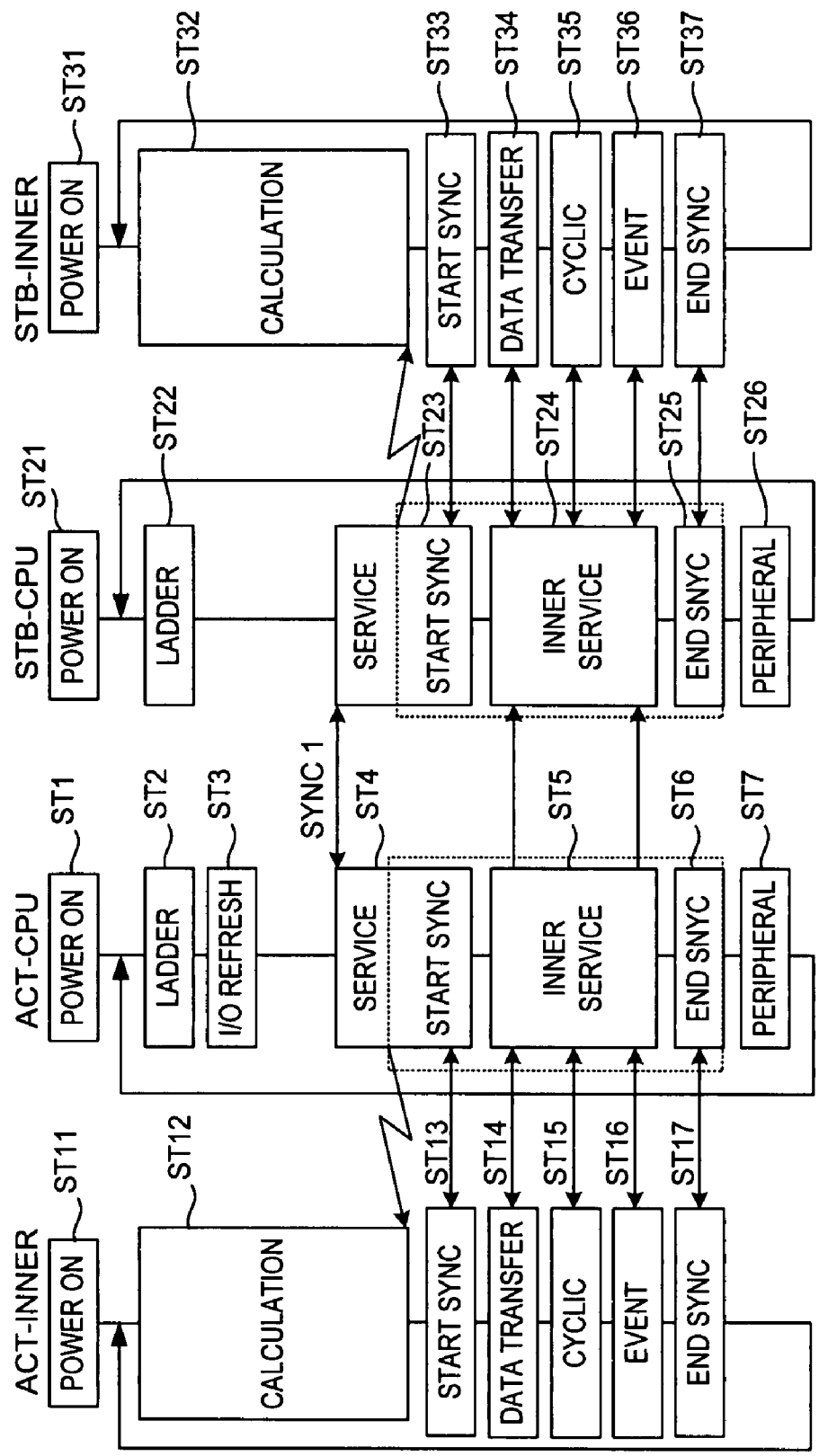
FIG. 3 is a flowchart for showing the operations of the CPU units and their inner boards.

Operations of the CPU units 12 and 13 and their inner boards 14 and 15 are explained next with reference to the flowchart of FIG. 3. To start, the active first CPU unit 12 (ACT-CPU) carries out a power-on process (ST1), initializing its RAM 12c, etc., checking the connection of the I/O unit and clearing the IO memory 12d. In the case of a normal start-up, a ladder process (LADDER) is carried out (ST2), that is, the user programs stored in the user memory 12a are sequentially carried out. Next, the I/O refresh process (I/O REFRESH) is carried out (ST3), that is, data in the preliminarily assigned input unit data area are updated with the data received from the input unit and the data in the output unit data area are transmitted to the output unit. It then becomes possible to obtain input data from input devices such as sensors and to output the results of calculations by the ladder process (or output data, etc.) to the apparatus being controlled. The result of this I/O refresh, or the content of the updated IO memory 12d, is also transmitted to the IO memory 13d of the second CPU unit 13 in the standby condition and written in.

Next, while synchronization is maintained with the second CPU unit 13, a synchronization process is started (START SYNC) with the active first inner board (ST4) and the inner service (INNER SERVICE) process is carried out (ST5). The inner service includes obtaining the results of calculations carried out by the first inner board 14, as will be explained below, and outputting a request for event processing. As this series of processes is finished, the peripheral service process is carried out (ST7) after the synchronization process is ended (ST6). The peripheral service includes exchanging data with units such as communication units having a specified function. Aforementioned steps ST2-ST7 are repeated cyclically.

In the meantime, the active first inner board 14 (ACT-INNER) carries out a power-on process (ST11), initializing its RAM 14c, etc., and performs calculations (ST12), or executes the user programs for the inner board stored in the RAM 14c. These calculations are carried out non-synchronously with the ladder process by the first CPU unit 12. Synchronization is started (ST13) when a synchronization command signal is received from the first CPU unit 12, and data-transfer, cyclic and event processes are carried out (ST14, ST15 and ST16) while the first CPU unit 12 is engaged with its inner services (ST5). When the synchronization process is completed (ST17), the active inner board returns to Step ST12 to restart the calculation. During the period of Step ST12, the first inner board 14 is prohibited from writing into the I/O data, that are control data on the IO memory 12d. If no synchronization command signal is received during this calculation period corresponding to Step ST12, the active inner board completes the calculations and waits for the signal. The operations in synchronism between the first inner board 14 and the first CPU unit 12 are carried out by using their common memory to transfer data. Details of the operations by the first inner board 14 during the period of synchronous operations will be given below.

Operations by the second CPU unit 13 in the standby condition are basically the same as those by the first CPU unit 12. After a power-on process (ST21), a ladder process (LADDER) is carried out (ST22). The I/O refresh process is not carried out but it becomes synchronized with the first CPU unit 12 and also with the second inner board 15 in the standby condition (ST23) and an inner service process is carried out (ST24). This inner service process includes obtaining the results of calculations executed by the first inner board 14 and outputting requests for event processes. After this series of processing is finished, the synchronization process is ended (ST25) and peripheral service processes are carried out (ST26).

The second inner board 15 in the standby condition (STB-INNER) carries out a power-on process (ST31), initializing its RAM 15c, etc., and performs calculations (ST32), or executes the user programs for the inner board stored in the RAM 15c. These calculations are carried out non-synchronously with the ladder process by the second CPU unit 13. The details of the calculations are the same as those by the first inner board 14. If no synchronization command signal is received from the second CPU unit 13 during the calculation period corresponding to Step ST32, the inner board 15 completes the calculations and waits for the signal.

Synchronization is started (ST33) when a synchronization command signal is received from the second CPU unit 13, and data-transfer, cyclic and event processes are carried out (ST34, ST35 and ST36) while the second CPU unit 13 is engaged with its inner services (ST24). When the synchronization process is completed (ST37), the inner board returns to Step ST32 to restart the calculation process.

If data are allowed to be written into the I/O data which are control data on the IO memories 12d and 13d when the inner boards 14 and 15 are engaged in the calculation processes, the equality of data between them may become spoiled. Thus, data are prohibited from being written into the I/O data serving as control data on the IO memories 12d and 13d during the calculation processes. Thus, calculations are carried out at a constant timing (as a cyclic process (ST15) or an event process (ST16)) and the I/O data which are the control data on the IO memories 12d and 13d are transferred to the CPU units by using the common memories. The CPU units write in these I/O data on the basis of these transferred data.

Next, details of a process routine for each processing step will be explained. In this example, the synchronization process is carried out by exchanging data by way of a command-response routine using common memories (IO memories 12d and 13d). First, CPU unit-inner board IF areas assigned to specified areas of the IO memories 12d and 13d to be used for the synchronization will be explained. Each of these areas is to be used for the status of a CPU unit and its inner board and also for the command-response between the CPU unit and the inner board, structured as shown in FIG. 4. Each CPU unit and inner board can read (R) from and write (W) in the area associated with itself but can only read from the area associated with the other CPU and the other inner board.

Figure 5:
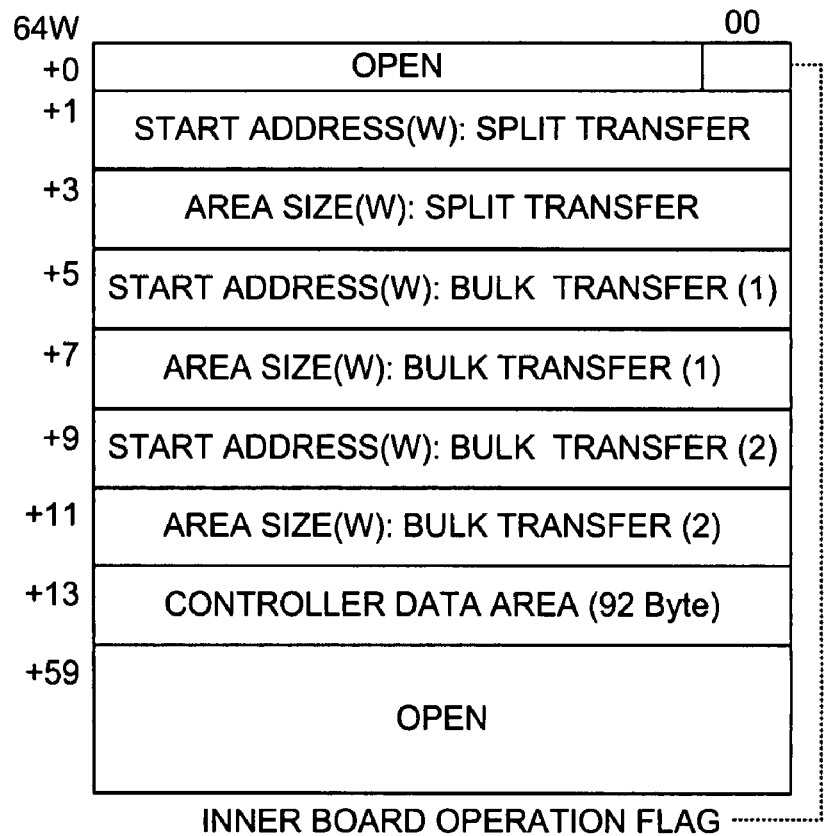
FIG. 5 shows an example of data structure in CPU status area.

In FIG. 4, the CPU status areas are the areas for the CPU unit to write in. The inner board operates to start and end calculations and other tasks according to a specified flag in these areas. The data structure of each CPU status area may be as shown in FIG. 5 wherein the "inner board operation flag" is a flag which indicates whether the inner board may operate (0) or may not operate (1). In other words, the inner board checks this flag at the beginning of each cycle (calculation-transfer of calculation results-event-cyclic), not carrying out the cycle of operations if this flag is "1". This flag becomes "1" when the CPU is in a wait condition, when it is waiting for the operation of another apparatus and when the equality of data between the active and standby units cannot be guaranteed such as during the initialization of a doubling process (or "doubling initial" process, as will be described below) on the standby side.

The starting addresses of the storage areas for the data to be transmitted out and their data sizes are also written in this CPU status area. The data areas can thus be identified from the specified starting addresses and data sizes when the data transfers are effected.

Figure 6:
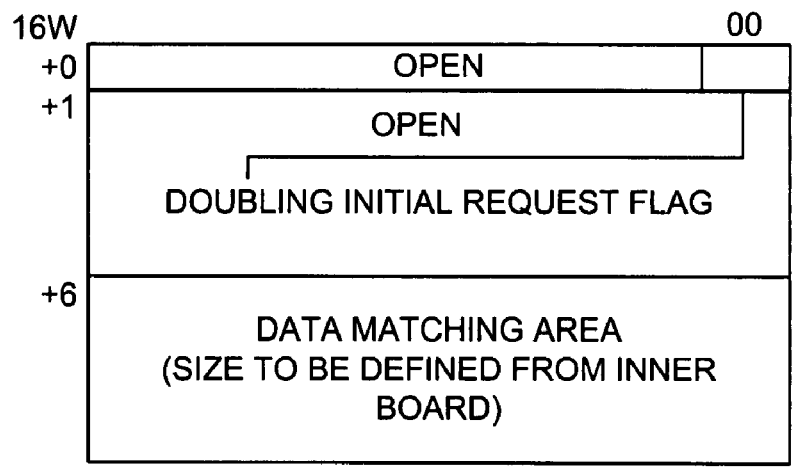
FIG. 6 shows an example of data structure in inner board status area.

The inner status area of FIG. 4 is an area for the inner board to write in. The CPU carries out the "doubling initial" startup and doubling matching process (to be explained below) according to a specified flag in this area. The data structure of the inner status area may be as shown in FIG. 6 wherein the "doubling initial request flag" is a flag which is used when the inner board wishes to affirmatively start the "doubling initial" process. It is set to "1" when it is desired to transfer the variable data and parameter data on the side of the active inner board (or the first inner board 14) to the inner board in the standby condition (or the second inner board 15). Requests for "doubling initial" process from the inner board in the standby condition are ignored. The "doubling initial" process is carried out automatically when the doubling operation is started. The flag may be set to "1" when it is desired to carry out a doubling initial while the doubling process is being operated.

The data matching area is an area to be used to check whether the inner conditions of the first and second inner boards 14 and 15 are matching such that they can be operated in synchronism. Data contents to be stored in this area are preliminarily defined and each of the inner board MPUs 14b and 15b writes in the defined contents. The first and second CPU units 12 and 13 compare the data stored in this data matching area. In the case of a matching error, doubled-up operations cannot be carried out. The timing for the matching of data for this comparison is when the inner boards are recognized as power is switched on or at the time of "doubling initial" processing.

The "CPU-inner board (CPU-INNER) command-response areas" are areas to be used for commands and responses between a CPU unit and an inner board. FIG. 7 shows an example of memory assignment. Examples of command and response used in this area are shown in FIG. 8. An example of routine for synchronization by using such areas and such commands and responses is explained next.

The steps for starting synchronization (ST4 and ST23 in the flowchart of FIG. 3) are initiated as the first and second CPU units 12 and 13 transmit an interrupt signal by using the interrupt signal lines 14e and 15e (shown in FIG. 2) to the inner boards 14 and 15, respectively. Next, a synchronization start command (START SYNC) is issued. This means that a specified command (0001) is written at a specified area in the CPU-INNER command-response area of the common memory assigned on the IO memories 12d and 13d, as shown in FIG. 9. A free-running counter for inner board is attached to the synchronization start command. This counter is used for the clock-matching of the inner board.

When such an interrupt signal for starting the synchronization process is received, the first and second inner boards 14 and 15 carry out the synchronization start process (ST13 and ST33 of FIG. 3) by accessing the corresponding IO memory 12d or 13d, obtaining the command and thereafter returning a response to the synchronization start command. There are the following two kinds of response: (1) Response "8001" when transferring results of calculations, event processes and cyclic processes are carried out, and (2) Response "4001" when they are not carried out. Response "4001" is returned when there is no change in the progress of calculations by the inner board since the previous cycle and hence there is no need to transfer the results of calculations. When the CPU unit receives this response, it skips all subsequent processing steps related to the result transferring, event and cyclic processes. The same responses will be returned both from the active and standby sides under normal circumstances if they are carrying out the same processes. If they do not match, the response from the active inner board will be considered to be the correct response.

After the synchronization start process is carried out (and Response "8001" is returned), the process of transferring calculation results is carried out. Since the doubling of components in this example is by the "hot standby" method, if data are allowed to be written into the IO memories 12d and 13d while the inner boards 14 and 15 are carrying out calculation processes, their data may become different. Thus, it is prohibited to write into the IO memories 12d and 13d while calculation processes are being carried out and the results of the calculations are transferred at a constant timing and are written into the IO memories 12d and 13d under specified conditions.

At this moment, the first and second CPU units 12 and 13 are in synchronism, and the first CPU unit 12 is capable of obtaining the conditions of the second CPU unit 13 and the second inner board 15 in the standby condition (such as the memory contents and the results of calculation in Step S14 by the first inner board 14), and the second CPU unit 13 can obtain, as a result of the data transfer from the first CPU unit 12, the conditions of the active first CPU unit 12 and the first inner board 14 (such as the memory contents and the results of calculation in Step 14 by the first inner board 14).

Thus, it can be determined whether the degrees of progress in the calculations by the first and second inner boards 14 and 15 match or not by comparing the results of calculations by the two inner boards 14 and 15. The first and second inner boards 14 and 15 carry out the same calculations. If their program processing speeds are the same and the same commands are processed thereby, the results of their calculations are the same. If the results of their calculations do not match, a correction process may be carried out to adjust their processing speeds such that the results of their calculations would match. After such a correction process, a condition is obtained in which the first and second inner boards 14 and 15 have processed up to the same command (at the same step), that is, the degrees of progress in the calculations by the two inner boards 14 and 15 are the same. If such correction processes are repeated appropriately, the degrees of progress in carrying out processes by the first and second inner boards 14 and 15 can be matched in units of cycles such that when the second inner board 15 is activated and switched from the standby condition to the active condition, quantities of control outputted with the results of calculations do not change abruptly from when the first inner board 14 was active such that the switch-over can be effected smoothly.

Figure 10:
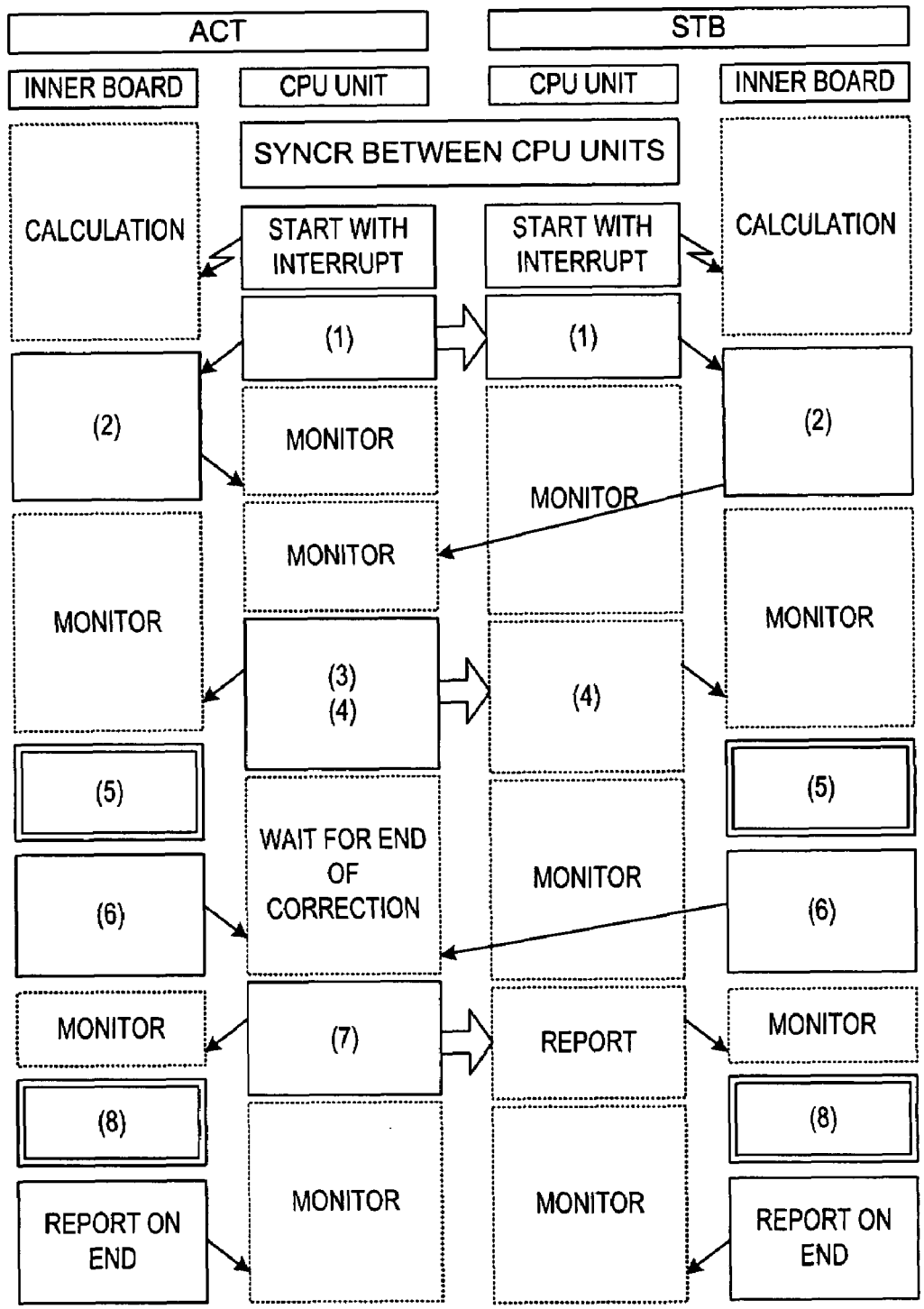
FIG. 10 shows an example of process routine for correcting calculation result.

FIG. 10 shows this process of correcting the result of calculations for matching the degree of progress in the calculation. Processes (1) to (8) shown in FIG. 10 are explained next.

Figure 11:
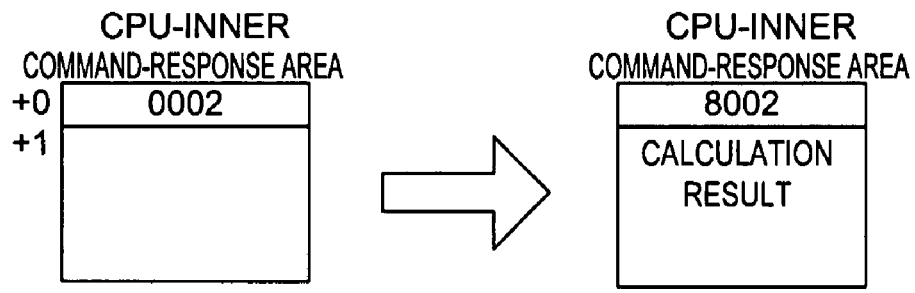
FIG. 11 shows an example of process for starting transfer of calculation result.

In Process (1), the active first CPU unit 12 issues a transfer start command to the active first inner board 14 and the standby second inner board 15 to start transfer of calculation results. This is done, as shown in FIG. 11 for example, by writing command "0002" at a specified area in the common memory. The same command "0002" is also written at a specified area in the common memory of the standby second CPU unit 13 by the I/F-ASIC 12e.

In Process (2), the first and second inner boards 14 and 15 issue a transfer response and simultaneously set calculation result data in the data area. In the above, the calculation result data are data for indicating the progress in calculation, or how far the execution of a user program has advanced, and may comprise the step number of the user program defined when the inner board was designed. FIG. 11 shows that not only is command "8002" but also calculation result data are registered.

In Process (3), as the transfer response is received from the first and second inner boards 14 and 15, the active first CPU unit 12 copies the calculation result data from the standby side into itself and transmits the calculation result data of the active sides to the standby side.

Figure 12:
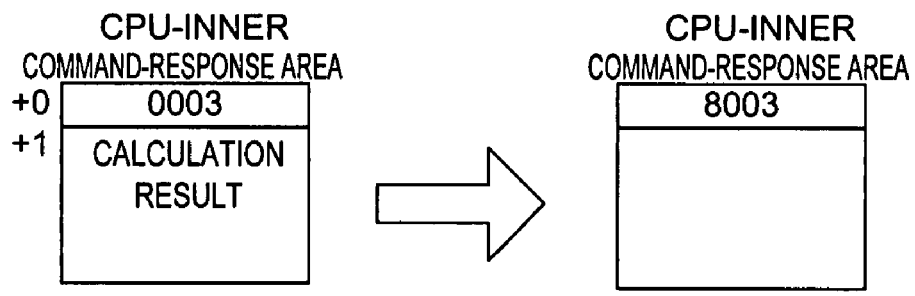
FIG. 12 shows an example of process for starting correction of calculation result.

In Process (4), the active first CPU unit 12 issues a correction command for starting a correction process to the first and second inner boards 14 and 15. This is done, as shown in FIG. 12 as an example, by the active first CPU unit 12 writing command "0003" at a specified area of the common area. This command is also written at a specified area of the command area of the standby second CPU unit 13 by the I/F-ASIC 12e. This enables the active first CPU unit 12 to output the correction command to the first and second inner boards 14 and 15.

In Process (5), the active first inner board 14 and the standby inner board 15 correct the condition of progress in the calculation on the basis of the calculation results of both boards. This is done by the slower calculating board to carry out a specified process so as to match itself to the rate of progress by the faster calculating board. Let us consider an example where the calculation result data are expressed in terms of the step numbers of a user program. If the user program for the first inner board 14 has been carried out to step number N1 and the user program of the second inner board 15 has been carried out to step number N2 smaller than N1 when the command to start correction is received, the slower calculating second inner board 15 carries out the user program to step N1 in order to match the first inner board 14.

In Process (6), the active and standby inner boards 14 and 15 issue and each return a calculation result correction start response. In the example shown in FIG. 12, the faster calculating inner board writes response "8003" in its own command area and the slower calculating inner board writes response "8003" in its own command area after completing the correction.

In Process (7), as the calculation result correction responses are received from the active and standby sides, the active first CPU unit 12 issues a command ("calculation result reflection permit command") to the first and second inner boards in the active and standby conditions. Explained more in detail, the active first CPU unit 12 writes this command at a specified area of the common area. The command thus written in is also written through the I/F-ASIC 12e at a specified area of the common area on the standby side. As a result, the active first CPU unit 12 becomes enabled to issue a calculation result reflection permit command to both the first and second inner boards 14 and 15.

In Process (8), the first and second inner boards cause the calculation result to be reflected upon receiving this command. After this process is completed, a response ("calculation result reflection permit response") is returned.

In summary, when a correction command is issued from the first and second inner boards and the correction process is completed, their conditions of progress come to match and the result of calculation by the inner boards is stored in the IO memory in this condition. FIGS. 13-19 show how data in the CPU-INNER command-response area change from the starting of calculation result transfer in Process (1) to the calculation result refection permit in Process (8) described above. In FIGS. 13-19, the left-hand side is the active (ACT) side and the right-hand side is the standby (STB) side. The areas where data change are shown hatched, and the data written in by being transferred from the active side are shown underlined.

Figure 13:
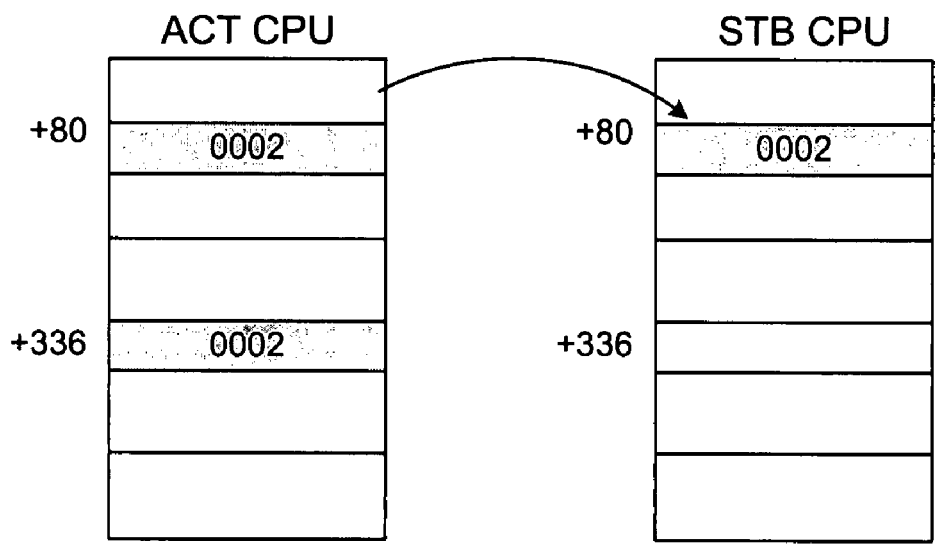
FIGS. 13-19 show examples of process for transferring calculation result.

Each of the processes will be explained briefly. FIG. 13 shows the "calculation result transfer start process" wherein the active first CPU unit 12 enters command "0002" indicating the calculation result transfer start into CPU-INNER command response area "+80" for the standby side and CPU-INNER command response area "+336" prepared on the IO memory 12d. The same command ("0002") written into area "+80" is transferred by the transfer process to CPU-INNER command response area "+80" of the standby second CPU unit 13.

Figure 14:
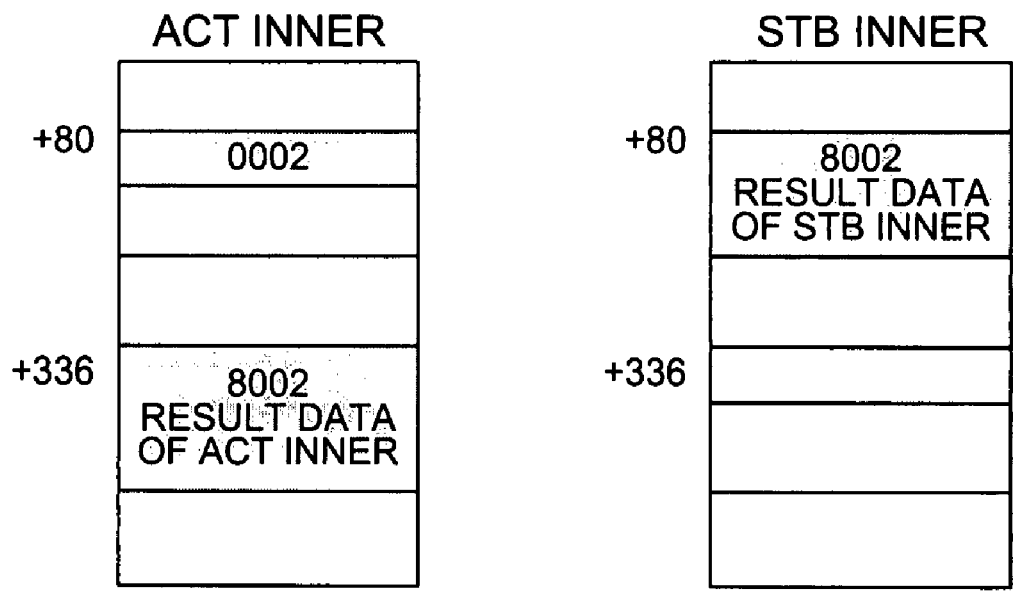

The inner boards, upon receiving this command "0002", return response "8002" to CPU-INNER command response area and each store its own calculation result data, as shown in FIG. 14. Explained more in detail, the active first inner board 14 writes response "8002" in CPU-INNER command-response area "+336" and stores its own calculation results in the subsequent area. The standby second inner board 15 also writes response "8002" in CPU-INNER command-response area "+80" and stores its own calculation results in the subsequent area.

Figure 15:
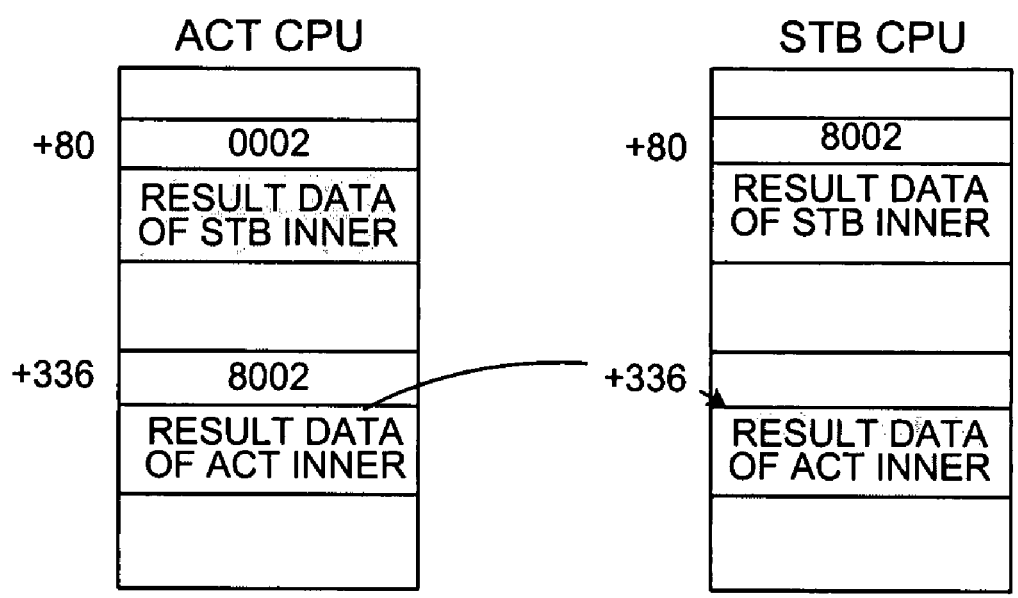

Next, each CPU unit copies the calculation result data of the other, as shown in FIG. 15. Explained more in detail, the first CPU unit 12 obtains the calculation result of the standby second inner board 15, stores it at a specified area of its own CPU-INNER command-response area and transfers the calculation result of the active first inner board 14 into a specified area of the CPU-INNER command-response area of the IO memory 13d of the second CPU unit 13.

Figure 16:
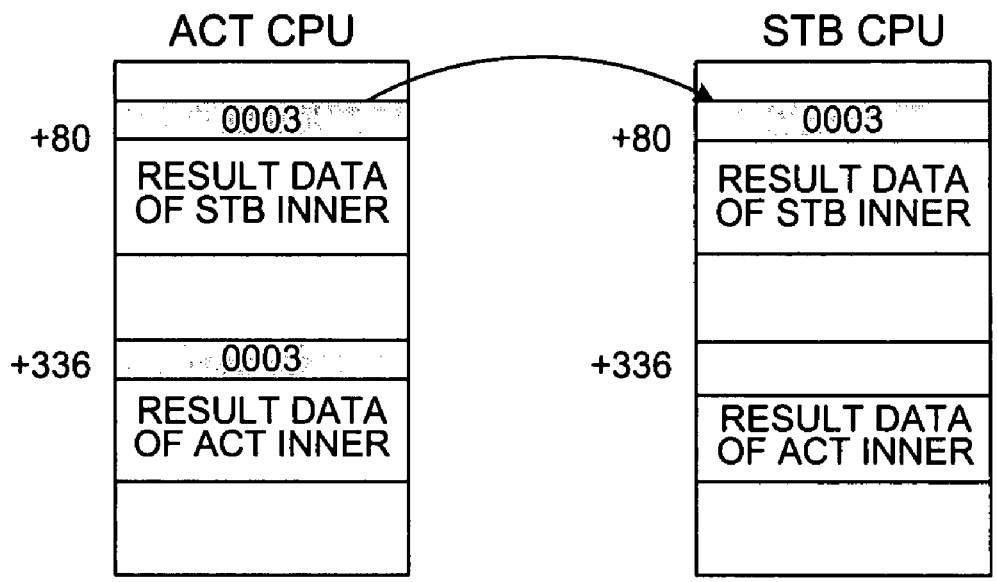

In the subsequent "calculation result correction start process", the active first CPU unit 12 enters command "0003" for starting the correction of calculation result into CPU-INNER command-response area "+80" prepared for the standby side and CPU-INNER command-response area "+336" prepared for the active side on the IO memory 12d. The same command "0003" written at "+80" is also written in CPU-INNER command-response area "+80" of the standby second CPU unit 13 by a transfer process, as shown in FIG. 16.

Figure 17:
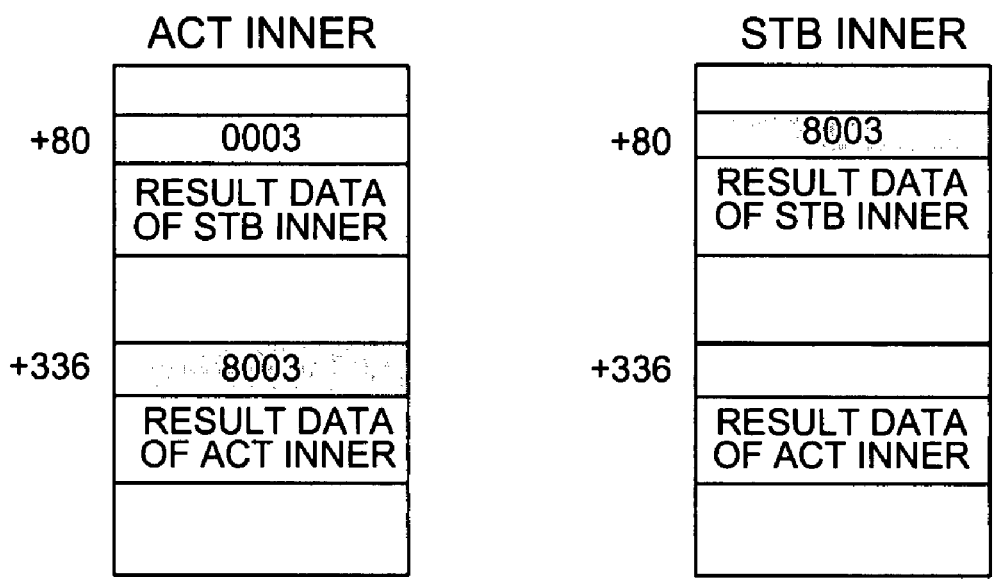

Having received the calculation result correction start command from the CPU unit, each inner board starts to correct the calculation result on the basis of the calculation result data from both sides and returns response "8003" when the process is completed, as shown in FIG. 17.

Figure 18:
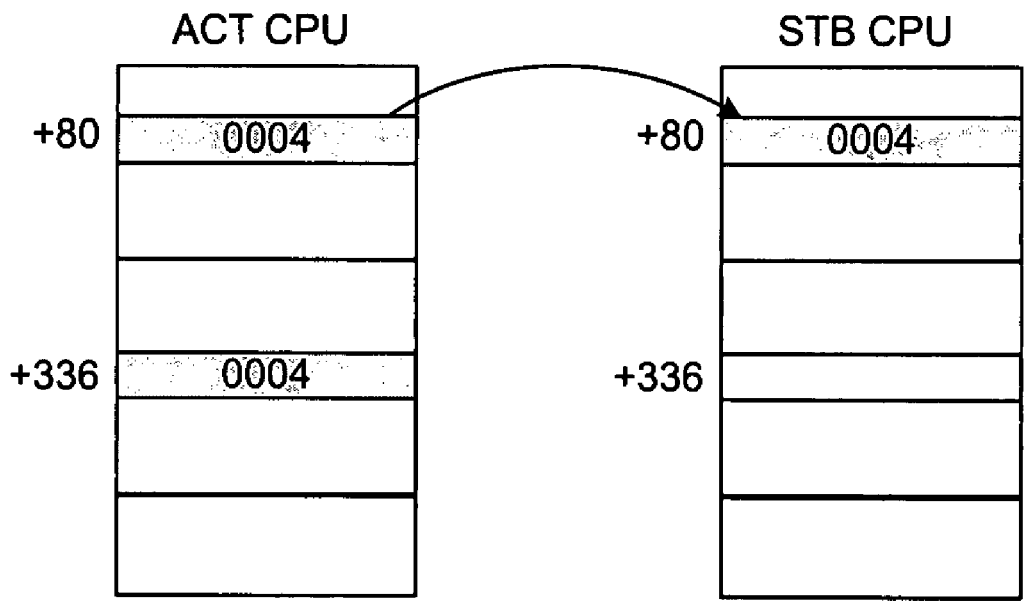

As this response "8003" is received, the active first CPU unit 12 enters command "8004" (aforementioned "calculation result reflection permit command") in CPU-INNER command-response area (+80) for the standby side and CPU-INNER command-response area (+336) for the active side prepared on the IO memory 12d. Command "0004" written at "+80" is also entered at CPU-INNER command-response area (+80) of the standby second CPU unit 13 by a transfer process, as shown in FIG. 18.

Figure 19:
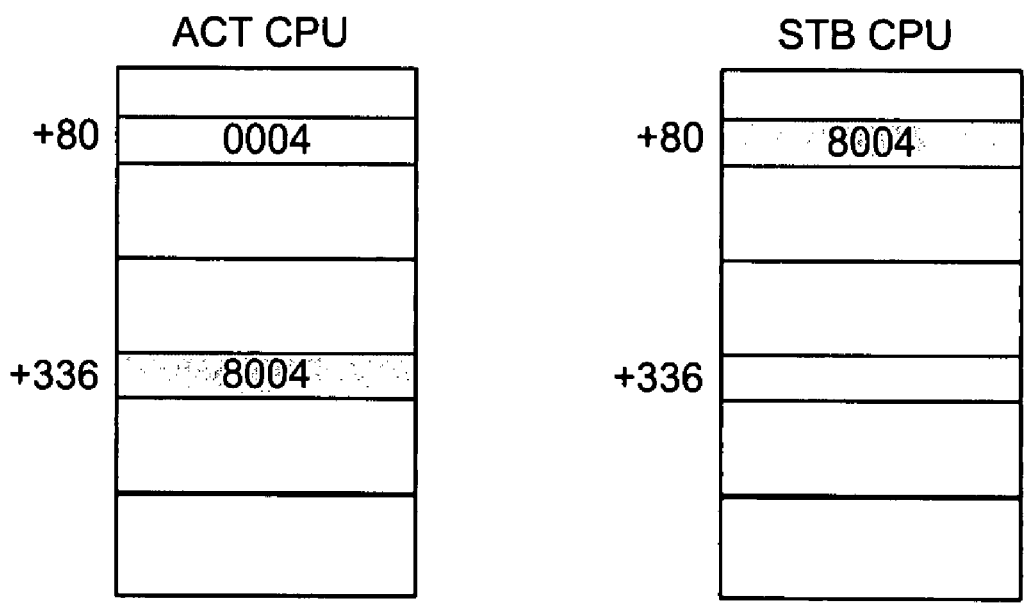

As this permission is received, both the first and second inner boards 14 and 15 return a permission response "8004" and enter the result of calculation at a specified area on the IO memory, as shown in FIG. 19.

Figure 20:
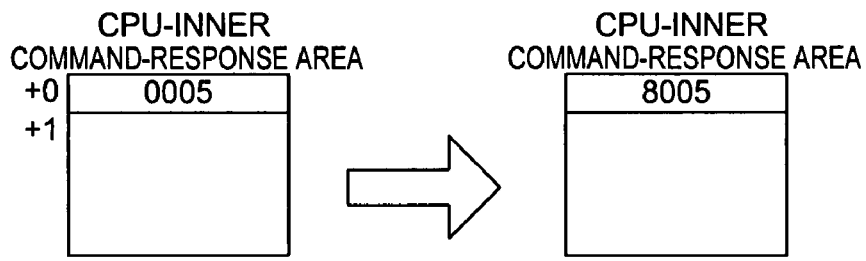
FIG. 20 shows an example of cyclic process.

Next, the cyclic processes are explained. The starting of the cyclic processes by the inner boards in Steps ST15 and SDT35 of FIG. 3 is matched by synchronization. The actual processing is carried out individually on the active and standby sides and there is no exchange of cyclic data. Explained more in detail with reference to FIG. 20, command "0005" for starting the cyclic processes is entered in CPU-INNER command-response area. The command is not directly issued to the standby side since it is transmitted onto the standby side by a transfer process. These cyclic processes make it possible to periodically exchange data between the CPU units and the inner boards.

Next, the event processes are explained. The event processes carried out in steps ST16 and ST36 of FIG. 3 are carried out as follows. Events from a CPU unit addressed to an inner board are carried out by the first and second inner boards 14 and 15 as the active CPU unit writes in an event execution start command in CPU-INNER command-responser area so as to have it also transferred to CPU-INNER command-response area on the standby side. Any response from the standby side is deleted by the CPU units. As the event processes are carried out, it becomes possible to exchange data in a non-periodic manner between the CPU units and the inner boards.

Figure 21:
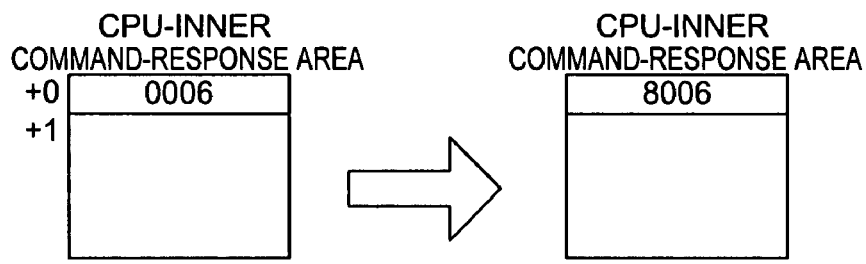
FIGS. 21 and 22 show examples of event execution process.
Figure 22:
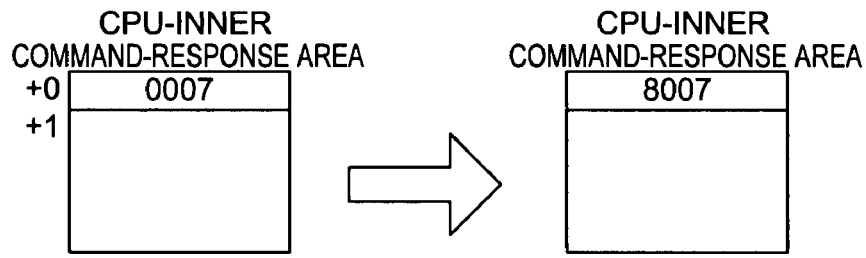
Figure 23:
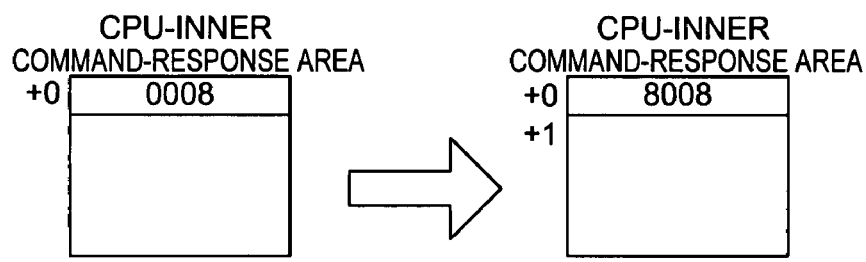
FIG. 23 shows an example of synchronization end process.

Events from an inner board addressed to a CPU unit may take a time slice over several cycles for the prosecution. For this reason, the conclusion of an event is communicated through a command. Explained more in detail by way of an example, command "0006" for informing the starting of the execution of an event is written in by the CPU unit, as shown in FIG. 21 and the inner board which receives it returns response "8007". The execution ends as command "0007" for informing the end of the execution is written in by the CPU unit as shown in FIG. 22 and the inner board which receives it returns response "8007". Since these commands are transmitted to the standby side by a transfer process, they are not issued directly. Moreover, the CPU units write in command "0008" for informing the end of synchronization in steps ST6 and ST25 of FIG. 3 and the inner boards which receive them return response "8008" in Steps ST17 and ST37 of FIG. 3.

Next, the aforementioned "doubling initial" process is explained. As described above, the data are normally the same for the first and second inner board 14 and 15 in their synchronized operations. If a tool is used, for example, to modify from outside the variable data or the parameter data stored on the RAM 14c of the active first inner board 14 or if a user program of the active first CPU unit 12 or data on the IO memory 12d (such as data to be subjected to I/O refresh and system setting data for the CPU unit) are modified from outside, data become different between the first and second inner boards 14 and 15 and also between the first and second CPU units 12 and 13 because no change is being made by such a tool on the second CPU unit 13 or the second inner board 15 in the standby condition.

Figure 24:
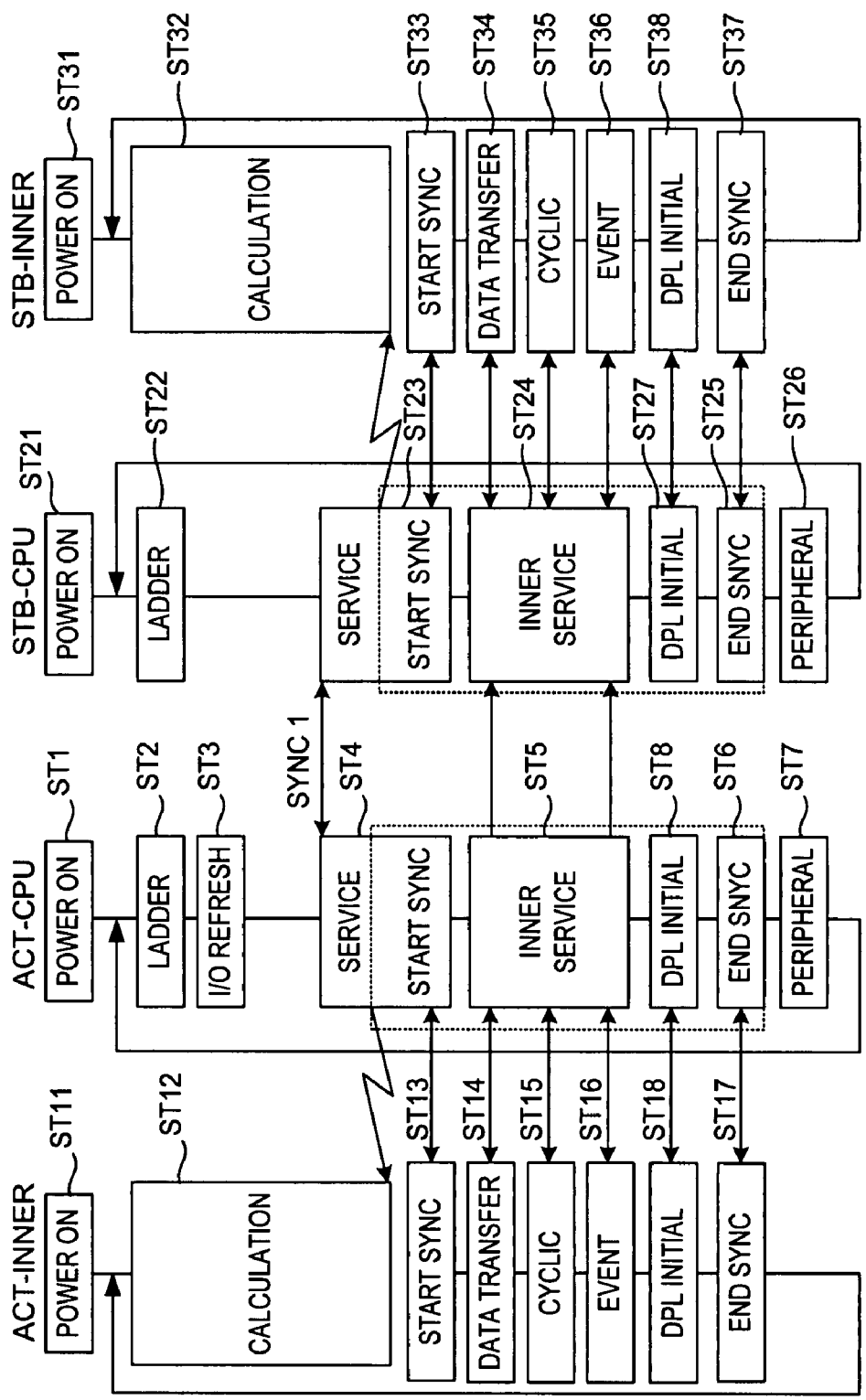
FIGS. 24 and 25 are flowcharts for showing the operations of "doubling initial" processes by the CPU units and their inner boards.

This is why a doubling initial process (DPL INITIAL) is carried out to maintain the equality of data between the two inner boards by transferring the variable data, the parameter data, etc. of the first inner board 14 to the side of the second inner board 15 and the user programs of the first CPU unit 12, etc. to the second CPU unit 13. This initialization process is carried out (steps ST8, ST18, ST27 and ST38) as shown in FIG. 24 after the inner service processes (steps ST5 and ST24) and the event processes (steps ST16 and ST36) are executed.

Figure 25:
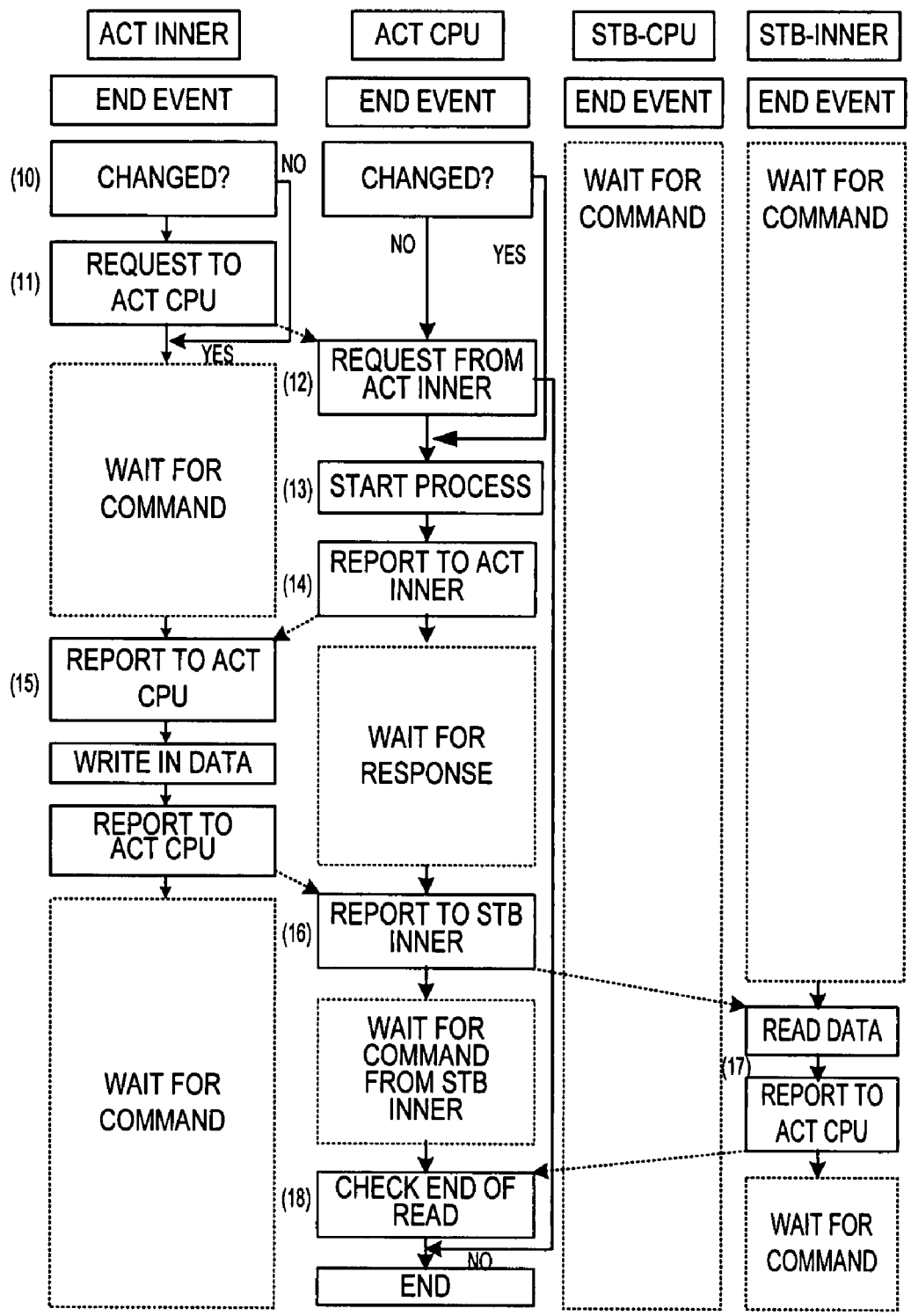
Figure 26:
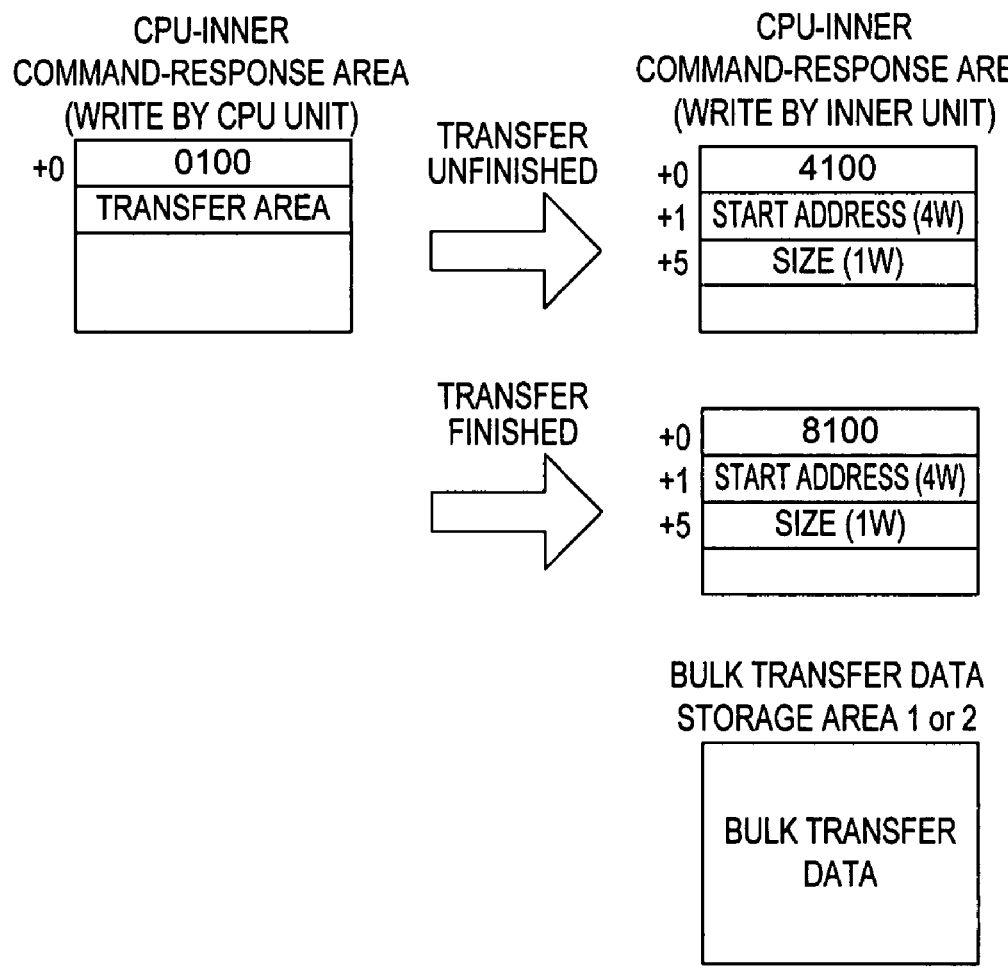
FIGS. 26-32 show an example of a bulk data transfer process.

The doubling initial processes (steps ST8, ST18, ST27 and ST38 of FIG. 24), after the execution of event processes, are explained more in detail next in terms of Processes (10)-(18) shown in FIG. 25.

In Process (10), the active first CPU unit 12 checks whether the user programs and the data on the IO memory 12d have been modified from outside and the first inner board 14 checks whether the variable data and the parameter data have been modified from outside.

In Process (11), the first inner board 14 requests the first CPU unit 12 to carry out the doubling initial process if it is judged that there has been a change from outside. This communication is made by raising the doubling initial request flag, as explained above with reference to FIG. 6. The first CPU unit 12 is monitoring this flag (Process (12)), or the presence of such a communication from the first inner board 14.

When this request is communicated, the doubling initial process is started (Process (13)). This process is started also when the first CPU unit 12 has had its user program or data on the IO memory 12d modified from outside. If no change has been made either on the first CPU unit or the first inner board 14, the process is ended with the doubling initial process executed.

Once the doubling initial process is commenced, the first CPU unit 12 provides the active first inner board 14 with information on the area to be used for transferring data (Process (14)). This is an area for data to be transferred when the double initial process is carried out and is selected such that both the first CPU unit 12 and the first inner board 14 can read and write data from and into this area. After this communication is made, the first CPU unit 12 waits for a response from the first inner board 14.

The first inner board 14 communicates to the first CPU unit 12 not only the start address for writing in data but also the data size and then begins to write the data at the position corresponding to this address (Process (15)). When this is finished, it is communicated to the first CPU unit 12 that the writing has been completed.

As this communication is received, the first CPU unit 12 informs the second inner board 15 in the standby condition of the obtained start address and data size and waits for an end command from the second inner board 15 (Process (16)).

On the basis of this communication from the first CPU unit 12, the second inner board in the standby condition reads out the data modified on the side of the first inner board 14 (Process (17)). After all of such data have been read out, the end of reading data is communicated to the active first CPU unit 12. When this information from the second inner board 15 is recognized, the first CPU unit 12 completes the doubling initial process (Process (18)).

The explanation of inner service process given above with reference to FIG. 25 relates only to the transfer of variable and parameter data from an active inner board to a standby inner board in the doubling initial process. Data transfer from an active CPU unit to a standby CPU unit for a doubling initial process may be carried out by the active CPU unit writing the user program on its user memory in the user memory of the standby CPU unit.

Process (17) explained above is actually carried out by transferring data. Two methods of data transfer may be provided, split and bulk data transfer methods. The choice of method is defined when the inner board is designed.

The bulk data transfer method is used when the transfer must be completed within one cycle because the execution of calculations is carried out alike on the active and standby sides if the method is operated in a doubled-up system. The variable data on an inner board are examples of data to be transferred by the bulk transfer method.

The split data transfer method is for situations where the transfer has no effect on the execution of calculations by the first and second inner boards 14 and 15 such that there is no problem if the data are transferred over a plurality of cycles.

Parameter data on an inner board are examples of data that may be transferred by the split data transfer method.

These methods of data transfer are effected through a CPU-INNER command-response area and usually after the cycle operations are completed, as explained above. An example of data transfer process by a command-response method by using a common memory is explained next with reference to FIGS. 26-32.

The bulk data transfer is carried out by a routine shown, for example, in FIGS. 26-32. Firstly, command "0100" for indicating bulk data transfer is written by a CPU unit in a specified area of the command-response area and a transfer data storage area to be used for the transfer is specified. In the example shown in FIG. 5, there are two such places prepared for this purpose. Either of them may be specified in Process (14) described above with reference to FIG. 25.

In response, the inner board stores the start address (which may be either an absolute address or a relative address) and the data size (say, in units of bytes or words) on the common memory and returns the present status (whether the transfer is unfinished ("4100") or finished ("8100") as response (Process (15) of FIG. 25).

Figure 27:
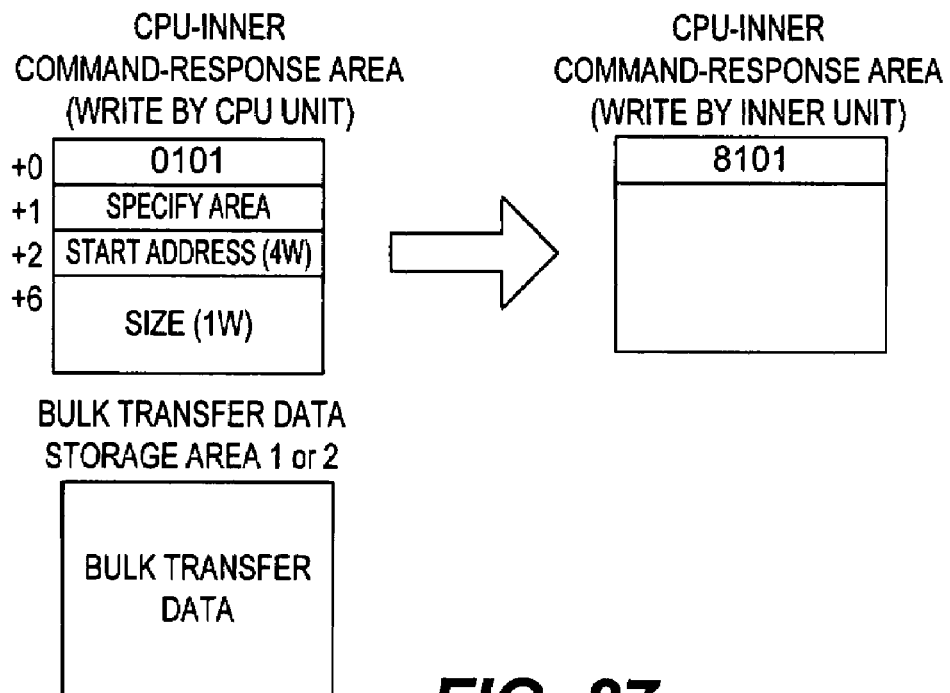

If command "8100" is received, the active first CPU unit 12 carries out the process of delivering the data received from the first inner board (such as parameter and variable data) to the second inner board 15 in the standby condition through the second CPU unit 13 in the standby condition. At this moment, the first CPU unit 12 transfers the data directly without checking them. In other words, the active first CPU unit 12 specifies the storage area (1 or 2) from where the transfer is to be made and writes in the size, as shown in FIG. 27. A response ("8101") is received thereupon from the addressee.

Figure 32:
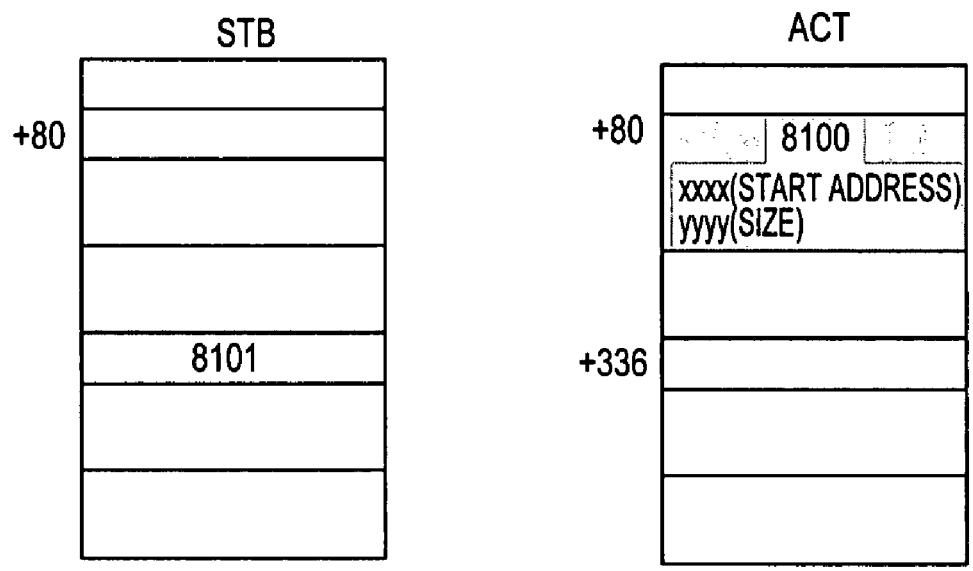

FIGS. 38-32 show an example of the data movements in the case of a bulk data transfer. In each of these figures, parts where data have been changed are shown hatched.

Figure 28:
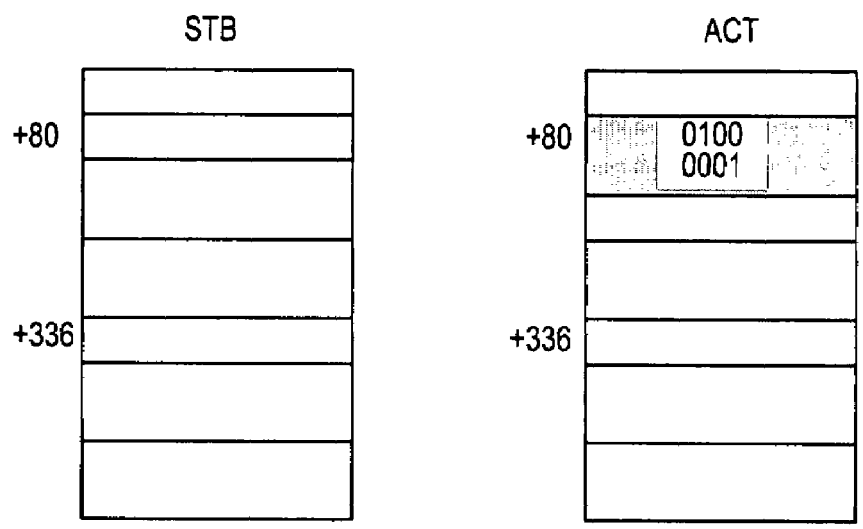
Figure 29:
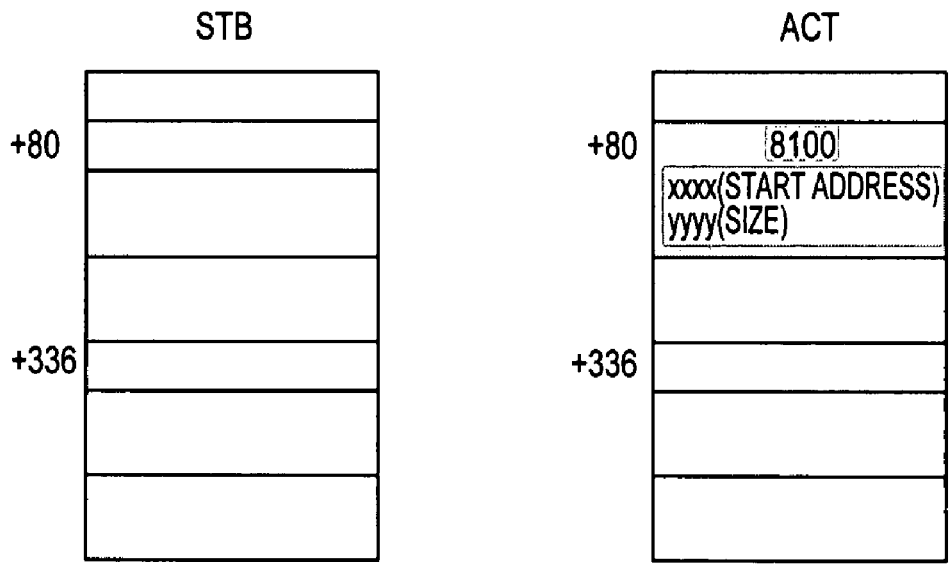
Figure 30:
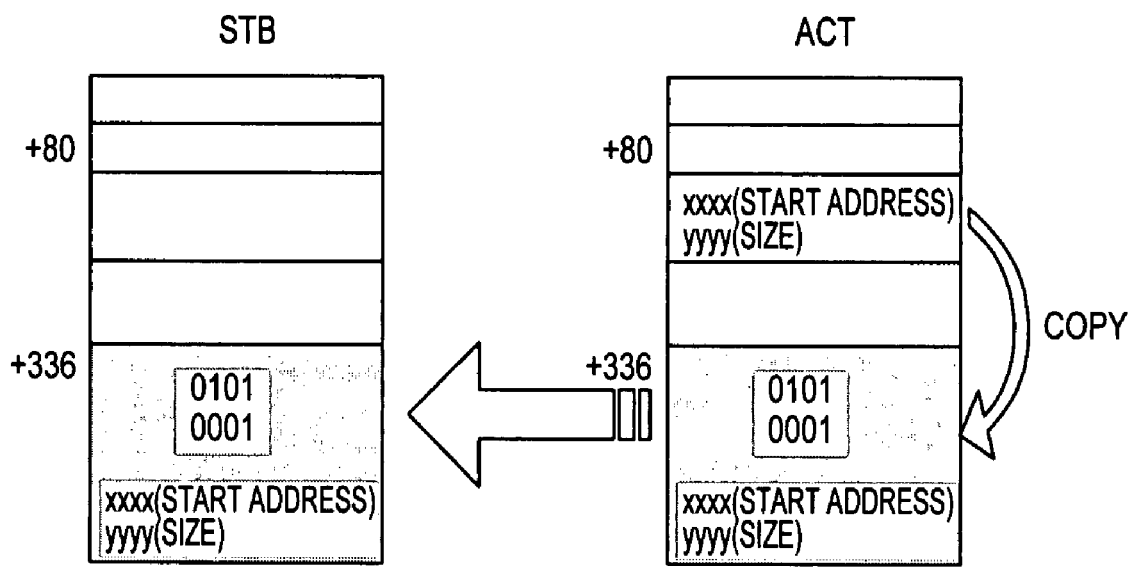

Firstly, the active first CPU unit inputs command "0100" for carrying out a bulk data transfer by using transfer area 1 (0001) (FIG. 28). In response, the active first inner board 14 writes in response "8100" and stores the start address and the size, as shown in FIG. 29. At the same time, the data to be transferred are stored in the specified area. Next, the active first CPU unit 12 copies the obtained start address and size in a specified area as shown in FIG. 30 (Process (16) of FIG. 25). As a result, command "0101" and the selected area (0001), as well as the start address and the size, are written in a specified area of the common memory on the standby side by the I/F-ASIC 12e. Actual data are also transferred at the same time (Process (17) of FIG. 25).

Figure 31:
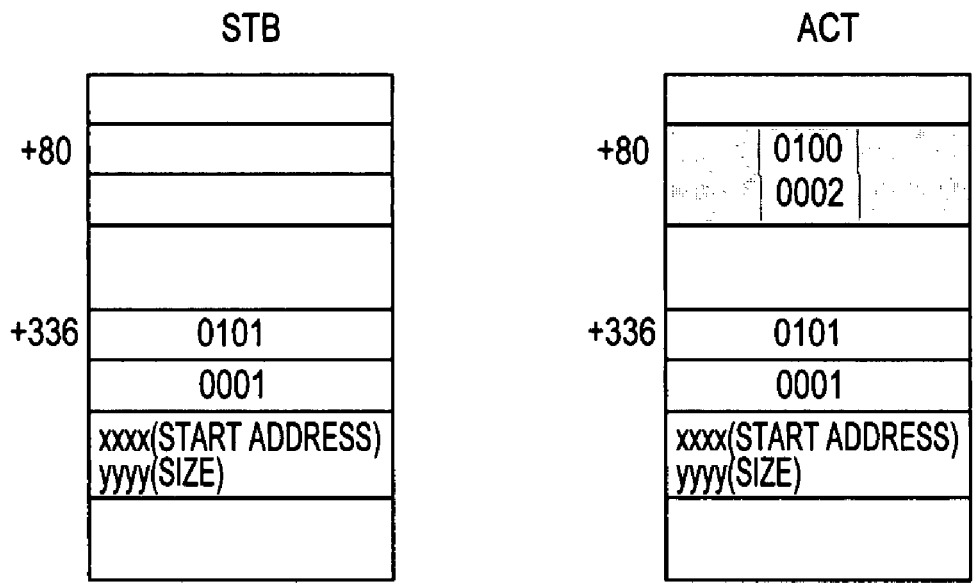

As the copying shown in FIG. 30 is completed, the first CPU unit 12 inputs command "0100" for the next transfer operation and specifies a different area (0002) for the data to be transferred, as shown in FIG. 31. By specifying a different area in this manner, the possibility of overwriting and erasing data can be reduced. As this command is inputted, the second inner board 15 in the standby condition returns bulk data transfer (from CPU to inner board) response "8101" and the active first inner board 14 returns bulk data transfer (from inner board to CPU) response "8100", as shown in FIG. 32.

A split data transfer, on the other hand, is carried out by delivering the contents of the parameter data of the active inner board through the CPU unit to the inner board in the standby condition. This process can be effected by a command-response process.

The aforementioned doubling initial process may be carried out not only when a change has been effected from outside, say, by means of a tool, but also when the power is switched on.

From the disclosure of the invention given above, it should be clear that a reliable doubled-up system can be formed with a programmable controller of this invention comprising two CPU units each having a special-function module mounted thereto.

What is claimed is:

1. A programmable controller comprising two CPU units each having a detachably attached special-function module that carries out a calculation process, wherein:
   each of said two CPU units recognizes conditions of the other of said two CPU units;
   one of said two CPU units becomes an active unit and the other of said two CPU units becomes a standby unit;
   when the active unit fails and goes down, the standby unit is switched to become active and resumes operations;
   the special-function module attached to the active CPU unit becomes an active module and carries out control processes with the active CPU unit; and
   the other special-function module attached to the standby CPU unit becomes a standby module;
   wherein said active CPU unit is synchronized with said standby CPU unit by way of executing an I/O refresh, said I/O refresh including updating an I/O memory in said active CPU unit with data received from input units and copying data of said I/O memory in said active CPU to an I/O memory in said standby CPU unit; and
   wherein the special-function module attached to the respective CPU unit obtains and compares results of said calculation process from both of the special-function modules and if said results do not match, the slower one of the special-function modules that is behind in said calculation process executes a correction process to further advance in said calculation process such that both of the special-function modules are equally advanced in said calculation process.

2. The programmable controller of claim 1:
   wherein each of said two CPU units exchanges data with the special-function module attached thereto through a common memory;
   wherein the two special-function modules carry out said calculation process non-synchronously with the two CPU units to obtain I/O data and do not store said I/O data in said common memory while carrying out said calculation process; and
   wherein said I/O data obtained by said calculation process are transferred to said CPU units during a synchronization process with the CPU units.

3. The programmable controller of claim 2:
   wherein, if any of data selected from a data group consisting of variable data and parameter data stored in a memory of said active special-function module is found to have a change caused from outside, the active special-function module transmits a request to the active CPU unit to carry out a doubling process; and
   wherein the active CPU unit, if said request is received, obtains at least information on said change in said memory, outputs said information to the standby special-function module, and causes the memory contents of the active and standby special-function modules to match.

4. The programmable controller of claim 1:
   wherein, if any of data selected from a data group consisting of variable data and parameter data stored in a memory of said active special-function module is found to have a change caused from outside, the active special-function module transmits a request to the active CPU unit to carry out a doubling process; and wherein the active CPU unit, if said request is received, obtains at least information on said change in said memory, outputs said information to the standby special-function module, and causes the memory contents of the active and standby special-function modules to match.

5. A method of providing a programmable controller with a doubled-up structure, said method comprising the steps of:
providing two CPU units each having a special-function module capable of carrying out a calculation process, one of said two CPU units being an active CPU in an active mode and carrying out a control process, the other of said two CPU units being a standby CPU unit in a standby mode;
causing one of the special-function modules attached to said active CPU unit to be an active module and to carry out said control process together with said active CPU unit and causing the other of the special-function modules attached to said standby CPU unit to be a standby module; and
causing said active CPU unit to be synchronized with said standby CPU unit by way of executing an I/O refresh, said I/O refresh including updating an I/O memory in said active CPU unit with data received from input units and copying data of said I/O memory in said active CPU to an I/O memory in said standby CPU unit;
wherein the special-function module attached to the respective CPU unit obtains and compares results of said calculation process from both of the special-function modules and if said results do not match, the slower one of the special-function modules that is behind in said calculation process executes a correction process to further advance in said calculation process such that both of the special-function modules are equally advanced in said calculation process; and
activating said standby CPU unit and said standby module into said active mode if an abnormal condition occurs in an active component selected from the group consisting of said active CPU unit and said active module.

6. A method of providing a programmable controller with a doubled-up structure, said method comprising the steps of:
providing two CPU units each having a special-function module capable of carrying out a calculation process, one of said two CPU units being an active CPU in an active mode and carrying out a control process, the other of said two CPU units being a standby CPU unit in a standby mode;
causing one of the special-function modules attached to said active CPU unit to be an active module and to carry out said control process together with said active CPU unit;
causing the other of the special-function modules attached to said standby CPU unit to be a standby module; and
causing said active CPU unit to be synchronized with said standby CPU unit by way of executing an I/O refresh, said I/O refresh including updating an I/O memory in said active CPU unit with data received from input units and copying data of said I/O memory in said active CPU to an I/O memory in said standby CPU unit;
causing each of the CPU units to exchange data with the corresponding one of the special-function modules through a common memory;
causing the two special-function modules to carry out said calculation process non-synchronously with said two CPU units to produce I/O data;
preventing said I/O data from being written into said common memory while said calculation process is being carried out; and
writing said I/O data into said common memory while the special-function modules are operating in synchronism with said CPU;
wherein the special-function module attached to the respective CPU unit obtains and compares results of said calculation process from both of the special-function modules and if said results do not match, the slower one of the special-function modules that is behind in said calculation process executes a correction process to further advance in said calculation process such that both of the special-function modules are equally advanced in said calculation process.

* * * * *